United States Patent
Zhao et al.

(10) Patent No.: US 9,277,579 B1
(45) Date of Patent: Mar. 1, 2016

(54) METHOD AND APPARATUS FOR SUPPORTING MULTIPLE CONNECTIONS IN 3GPP SYSTEMS

(71) Applicant: Marvell International Ltd., Hamilton (BM)

(72) Inventors: Fan Zhao, San Jose, CA (US); Ameya Damle, Santa Clara, CA (US); Stefano Faccin, Hayward, CA (US)

(73) Assignee: Marvell International Ltd., Hamilton (BM)

( * ) Notice: Subject to any disclaimer, the term of this patent is extended or adjusted under 35 U.S.C. 154(b) by 138 days.

(21) Appl. No.: 14/056,778

(22) Filed: Oct. 17, 2013

Related U.S. Application Data

(63) Continuation of application No. 12/640,460, filed on Dec. 17, 2009, now Pat. No. 8,566,455.

(60) Provisional application No. 61/142,744, filed on Jan. 6, 2009, provisional application No. 61/138,326, filed on Dec. 17, 2008.

(51) Int. Cl.
*H04B 7/00* (2006.01)
*H04W 76/02* (2009.01)

(52) U.S. Cl.
CPC .................................. *H04W 76/025* (2013.01)

(58) Field of Classification Search
CPC ............ H04W 36/00; H04W 36/0011; H04W 36/0022; H04W 36/0027; H04W 36/0083
USPC ........................... 370/310, 328, 331, 332, 464
See application file for complete search history.

(56) References Cited

U.S. PATENT DOCUMENTS

| | | | | |
|---|---|---|---|---|
| 8,170,010 | B2 * | 5/2012 | Bachmann et al. | 370/389 |
| 8,270,980 | B2 * | 9/2012 | Forssell | 455/439 |
| 8,654,716 | B2 * | 2/2014 | Wong | 370/329 |
| 8,666,419 | B1 * | 3/2014 | Faccin et al. | 455/438 |
| 8,681,739 | B1 * | 3/2014 | Zhao et al. | 370/331 |
| 2008/0253382 | A1 | 10/2008 | Bachmann et al. | |
| 2009/0135749 | A1 | 5/2009 | Yang | |
| 2010/0091653 | A1 | 4/2010 | Koodli et al. | |
| 2010/0215019 | A1 | 8/2010 | Velev et al. | |
| 2010/0273475 | A1 * | 10/2010 | Lee et al. | 455/426.1 |
| 2012/0188944 | A1 | 7/2012 | Bachmann et al. | |

OTHER PUBLICATIONS

R. Wakikawa, et al., "Multiple Care-of Addresses Registration", retrieved at ••http://tools.ietf.org/pdf/draft-ietf-monami6-multiplecoa-08.pdf••, MEXT Working Group, Published Date May 30, 2008, pp. 1-44.

* cited by examiner

*Primary Examiner* — Dmitry H Levitan

(57) ABSTRACT

A method and apparatus for establishing connectivity between a mobile node and a plurality of packet data networks. The method includes establishing a first connection between a mobile node and a first packet data network, the first connection being made through a first access network; establishing a second connection between the mobile node and a second packet data network, the second connection being made through a second access data network; establishing a third connection between the mobile node and the first packet data network, the third connection being made through the second access network; and simultaneously sending data from the mobile node to the first packet data network over the first connection and the third connection.

19 Claims, 16 Drawing Sheets

| BINDING CACHE |||| 
|---|---|---|---|
| HOA1 | COA1<br>BID1 | COA2<br>BID2 | |
| HOA2 | COA | | |
FIG. 3
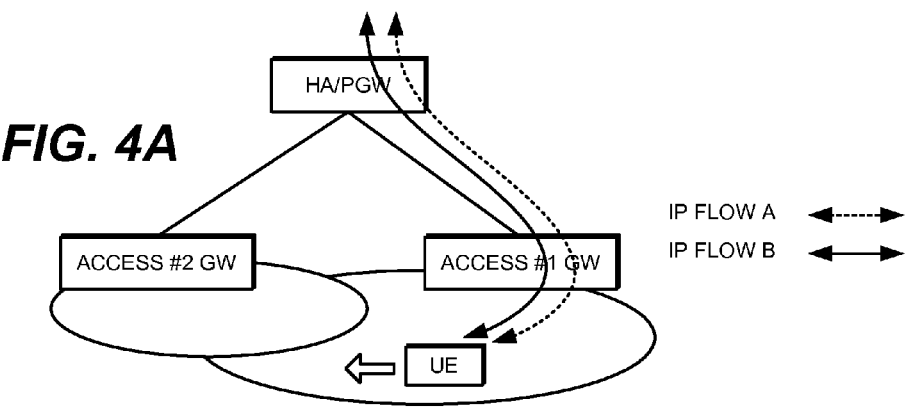
FIG. 4A
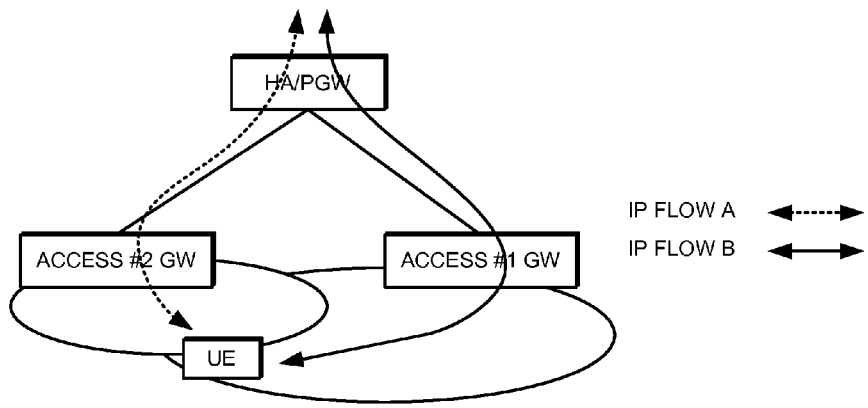
FIG. 4B

METHOD AND APPARATUS FOR SUPPORTING MULTIPLE CONNECTIONS IN 3GPP SYSTEMS

CROSS-REFERENCE TO RELATED APPLICATIONS

The present disclosure is a continuation of and claims priority to U.S. patent application Ser. No. 12/640,460, filed Dec. 17, 2009, now U.S. Pat. No. 8,566,455, issued Oct. 22, 2013, which claims the benefit of U.S. Provisional Patent Application No. 61/142,744, filed Jan. 6, 2009, and U.S. Provisional Patent Application No. 61/138,326, filed Dec. 17, 2008, which are incorporated herein by reference.

FIELD

The present disclosure generally relates to wireless networks.

BACKGROUND

The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU). FIG. 1 illustrates a 3GPP architecture for multiple access in a non-roaming scenario, and FIG. 2 illustrates a 3GPP architecture for multiple access in a roaming scenario. The architectures depicted in FIGS. 1 and 2 show the scenarios in which a client-based mobility protocol S2c—i.e., DSMIPv6 (Dual stack Mobile IPv6)—is used for connectivity and mobility between 3GPP accesses and non-3GPP accesses. S2c is described in more detail in 3GPP TS 23.402 V8.3.0 and 3GPP TS 23.401 V8.3.0, which are incorporated herein by reference. The mechanisms specified in 3GPP TS 23.402 can be used to connect a user equipment (UE) (or mobile terminal) in parallel to an evolved packet core (EPC) via a 3GPP access network and a non-3GPP access network towards different packet data networks (PDNs).

Currently, the 3GPP specifications listed above—3GPP TS 23.402 V8.3.0 and 3GPP TS 23.401 V8.3.0—do not specify how a UE can simultaneously access a network through multiple heterogeneous accesses. However, the mechanisms specified in the specifications listed above can be used to connect a UE in parallel (via different PDNs) to an EPC via 3GPP access network and a non-3GPP access network.

SUMMARY

In general, in one aspect, this specification describes a mechanism for a mobile node connected to a first packet data network over a first access network and a second packet data network over a second access network to set up additional connectivity to the first existing packet data network over the second access network to exchange certain different flows with the first packet data network over these two access networks simultaneously. Alternatively, the mobile node can set up additional connectivity to the second existing packet data network over the first access network to exchange certain different flows with the second packet data network over the two access networks simultaneously.

BRIEF DESCRIPTION OF THE DRAWINGS

FIG. 3 illustrates an example binding cache in a home agent (HA)/packet data network gateway (PGW) when multiple CoAs are registered for the same HoA with different binding descriptors.

FIGS. 4A-4E illustrate various scenarios of simultaneous connectivity through multiple heterogeneous accesses.

DETAILED DESCRIPTION

Two Internet Engineering Task Force (IETF) specifications—IETF draft-ietf-monami6-multiplecoa-08, and IETF draft-ietf-mext-flow-binding-00a—describe techniques for supporting multiple IP flows over different accesses. The techniques are based on Extensions to DSMIPv6 where a UE can perform multiple CoA (Care-of Address) registrations for the same HoA (Home Address) with the HA (Home Agent), and traffic is routed to the different CoAs based on flow binding (i.e., traffic descriptors that filter the traffic and route the traffic to the correct CoAs-downlink packets addresses to the UE are received by the HA, the filters are applied, and packets are routed towards the CoA corresponding to the matching filter). It is therefore possible to extend S2c in 3GPP (i.e., the interface based on DSMIPv6) in order to allow a UE to be connected simultaneously to the same PDN via different accesses and to move IP flows between the different accesses.

Specifically, the techniques include the following features. Multiple DSMIPv6 CoAs registrations occur at the DSMIPv6 level with the HA (Home Agent)/PGW (PDN Gateway). The different CoAs are obtained over different access networks. The different CoAs are then used simultaneously by the UE. One Binding Cache Entry (BCE) is created for each CoA. The mapping between HoA and CoA is no more a one-to-one but one to many. DSMIPv6 BUs (Binding Update messages) can contain more than one CoAs. A BID (Binding Identifier) is used to univocally identify the HoA-CoA mapping. A BU (Binding Update) contains as many BID options as the number of CoAs in the BU. DSMIPv6 BUs can contain description of flows associated with each CoA. Each BU can contain a FID (Flow ID) option. The FID option includes a flow identifier and a flow description and a pointer to the respective BID. The routing of UL (uplink) and DL (downlink) packets is performed based on these associations. For example, FIG. 3 illustrates an example binding cache in a home agent (HA)/packet data network gateway (PGW) when multiple CoAs are registered for the same HoA with different binding descriptors.

Figure 1:
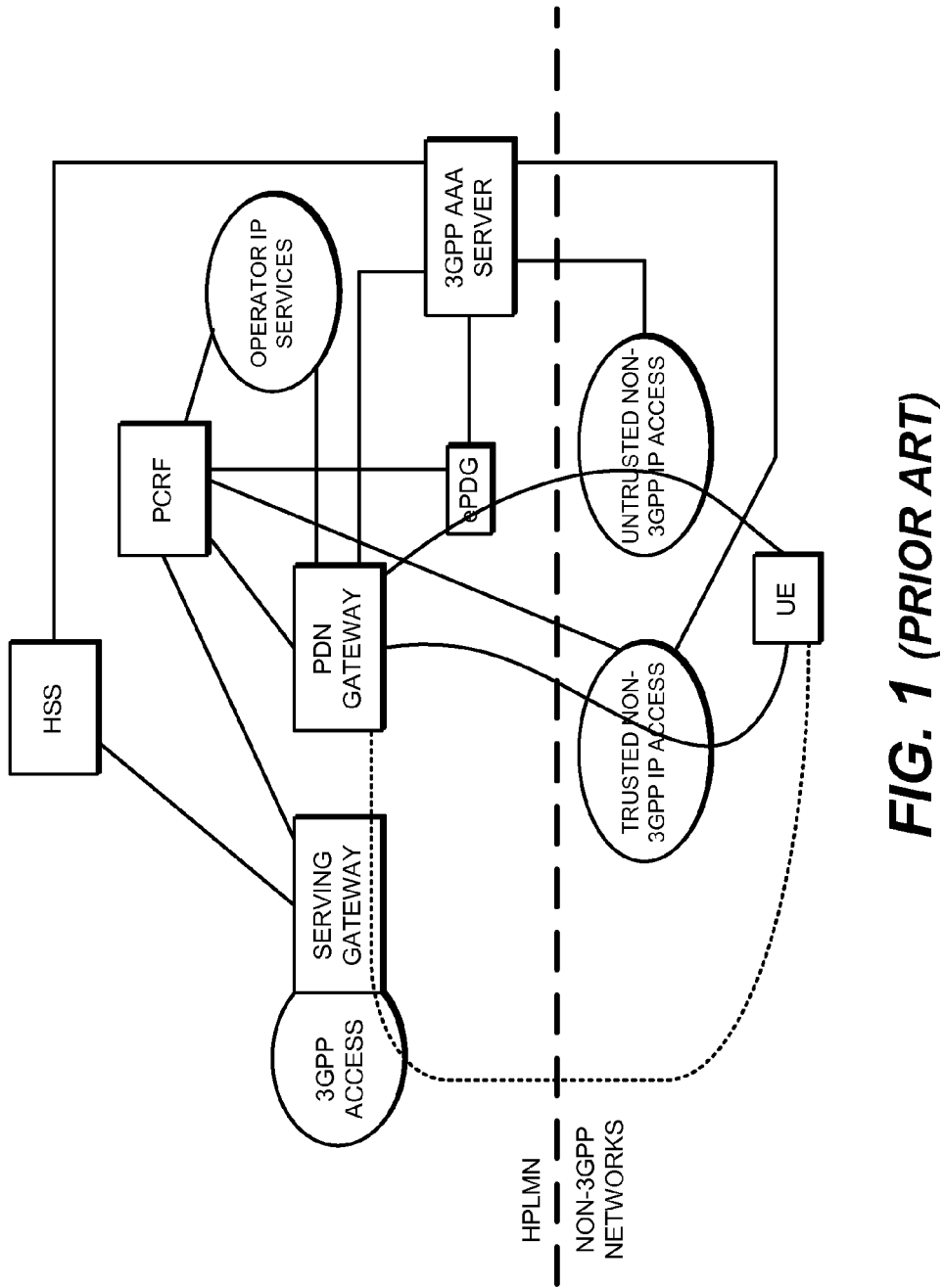
FIG. 1 illustrates a 3GPP architecture for multiple access in a non-roaming scenario.
Figure 2:
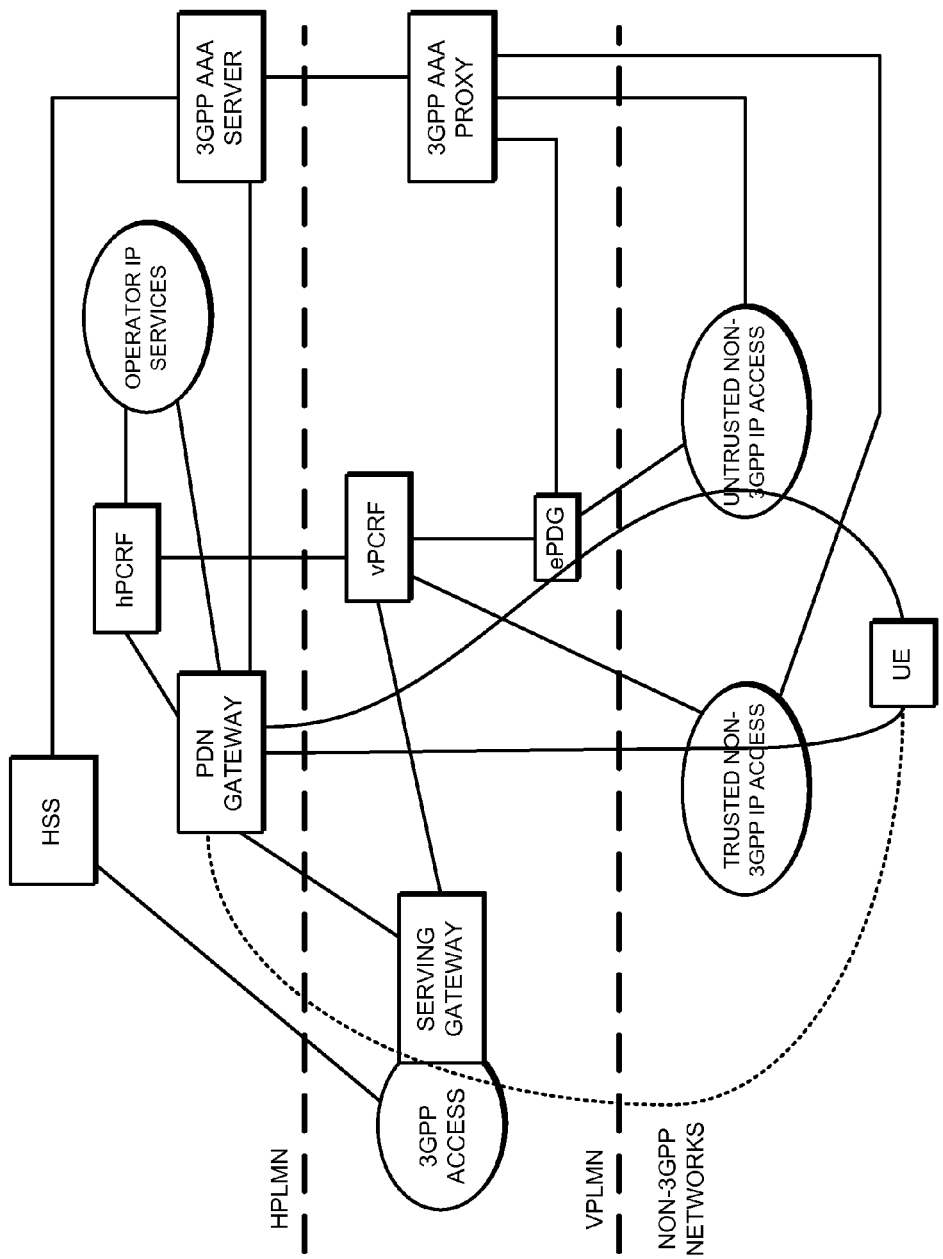
FIG. 2 illustrates a 3GPP architecture for multiple access in a roaming scenario.
Figure 4C:
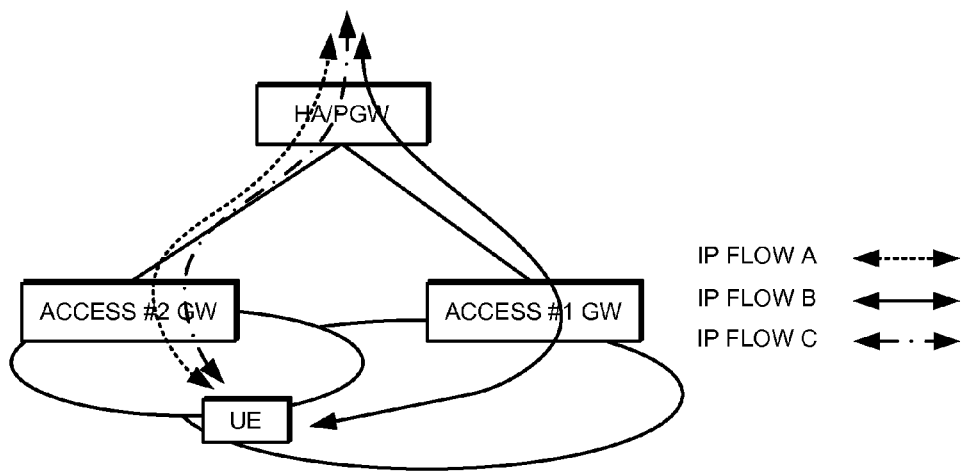
Figure 4D:
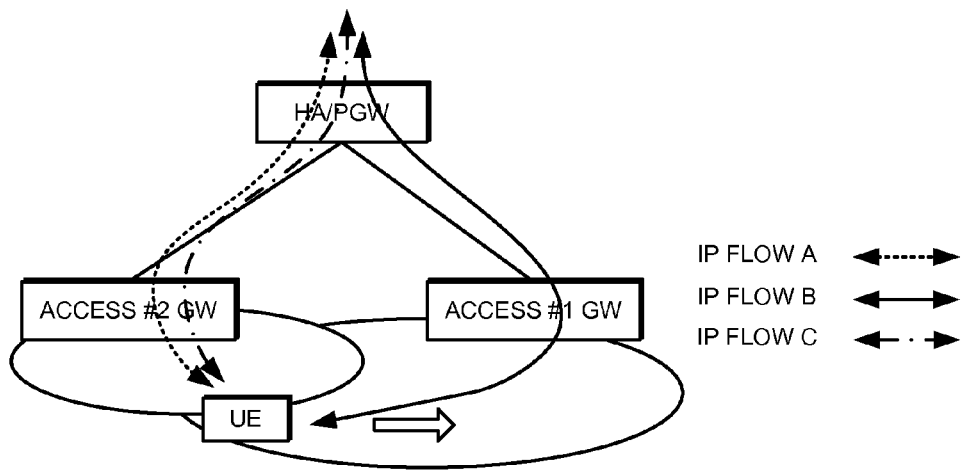
Figure 4E:
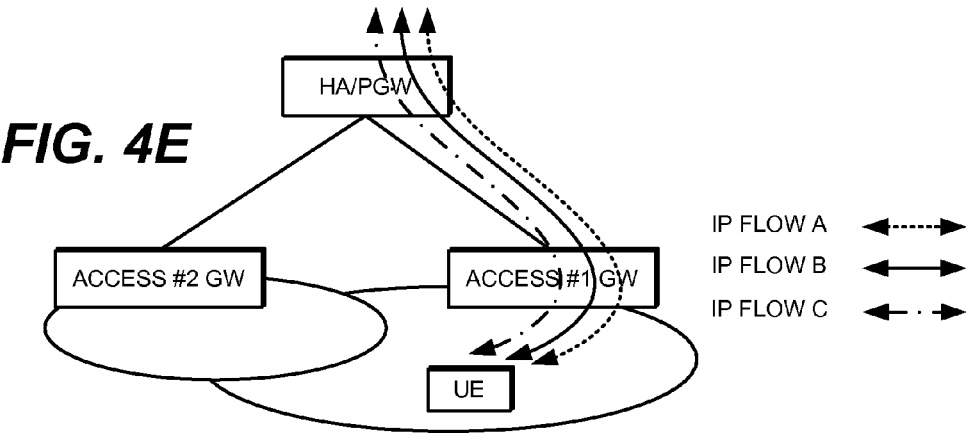

FIGS. 4A-4E illustrate various scenarios of simultaneous connectivity through multiple heterogeneous accesses. Simultaneous connectivity through multiple heterogeneous accesses is useful as multi-radio UEs start to become more common (e.g., 3GPP+WLAN in the home environment) and the UEs may have a form factors different than a "phone". As a result, a UE may be connected through different accesses to the same PDN. In such scenarios it is possible to use the UE's ability to connect via multiple accesses in parallel in order, e.g., to increase the overall bandwidth experienced by the UE to a given PDN. In such scenarios IP flows could be dynamically switched between cellular and other accesses where, e.g. "less valuable" high volume traffic could be dynamically "offloaded" to unlicensed accesses. IP flows would still be switched between different accesses due to an actual handover, e.g., when one access is no longer available. In FIG. 4A, the UE initially has connectivity through Access #1, and both IP flows A and B are routed through Access #1. In FIG. 4B, the UE detects another access (Access #2), and IP flow A is routed through Access #2. In FIG. 4C, the UE adds an additional IP flow (IP flow C) over Access #2. In FIG. 4D, the UE moves towards an area of coverage in which only Access #1 is available. As shown in FIG. 4E, all the IP flows A, B, C are moved to Access #1. Various scenarios are described in detail below.

Figure 5:
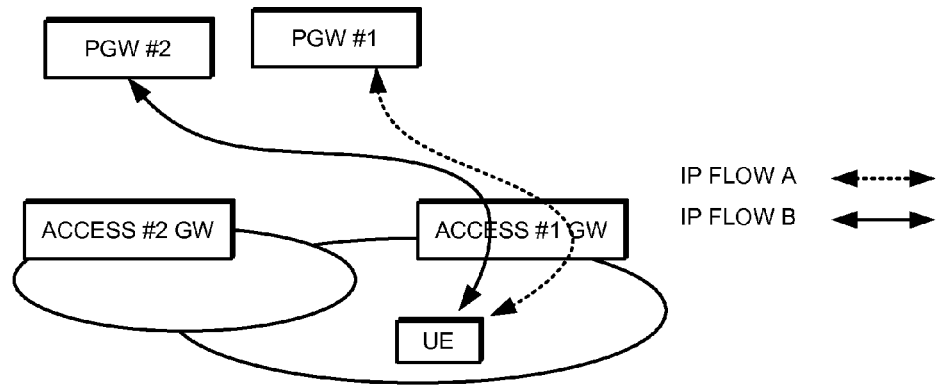
FIG. 5 illustrates a scenario of simultaneous connectivity through multiple heterogeneous accesses.

The 3GPP specification also defines a procedure referred to as the UE requested PDN connectivity procedure. Note: The name of this procedure may be slightly different on different access networks. The procedure defines techniques for a UE to connect to multiple PDNs through one access network, including GTP or PMIP based 3GPP access, trusted non3GPP access with s2a and s2c, untrusted non3GPP access with s2b and s2c. As shown in FIG. 5, the UE connects to, for example, two different PDN GWs, from one single access network.

Figure 6:
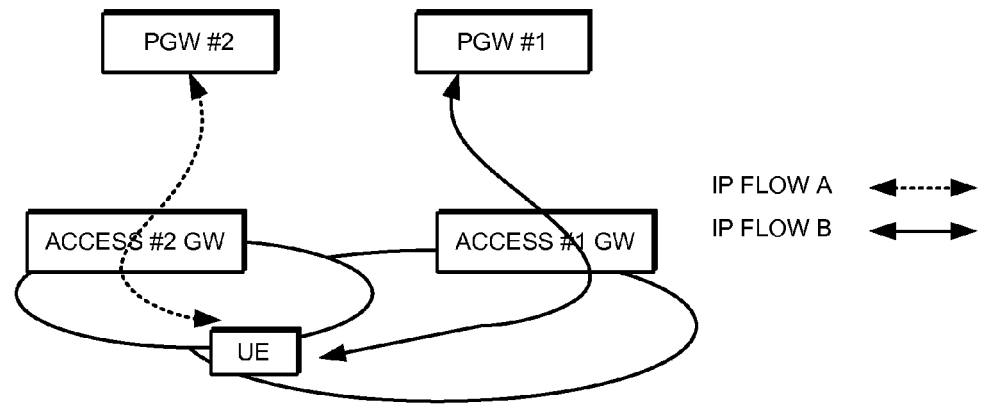
FIG. 6 illustrates a scenario of simultaneous connectivity through multiple heterogeneous accesses.
Figure 7:
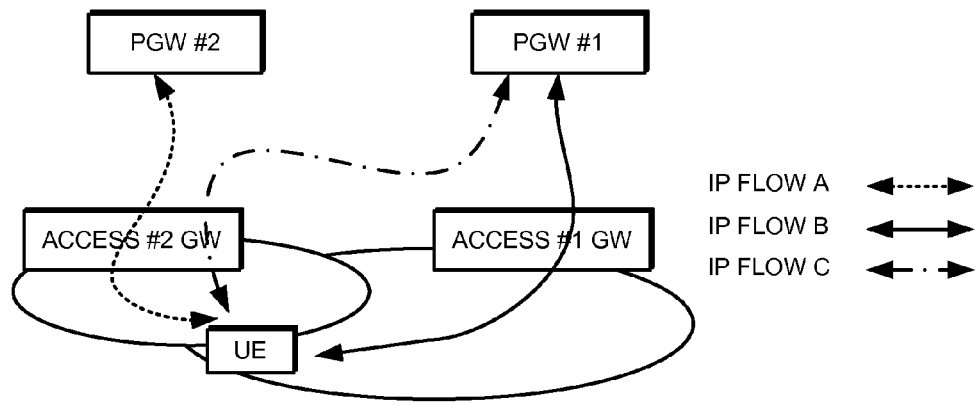
FIG. 7 illustrates a scenario of simultaneous connectivity through multiple heterogeneous accesses.

Since it is possible for a UE to connect to multiple access networks simultaneously, a UE can connect to a first packet data network gateway (PDN GW 1) and a second packet data network gateway (PDN GW 2) from different access networks, as shown in FIG. 6. When the UE connects to multiple PDNs through different access networks simultaneously as shown in FIG. 6, later when the UE wants to access, for example, the PDN GW 1, through both access networks simultaneously (as shown in FIG. 7), based on the current 3GPP specification, the UE needs to perform a UE requested PDN connectivity procedure since the UE already is attached to the second access network.

Figure 8:
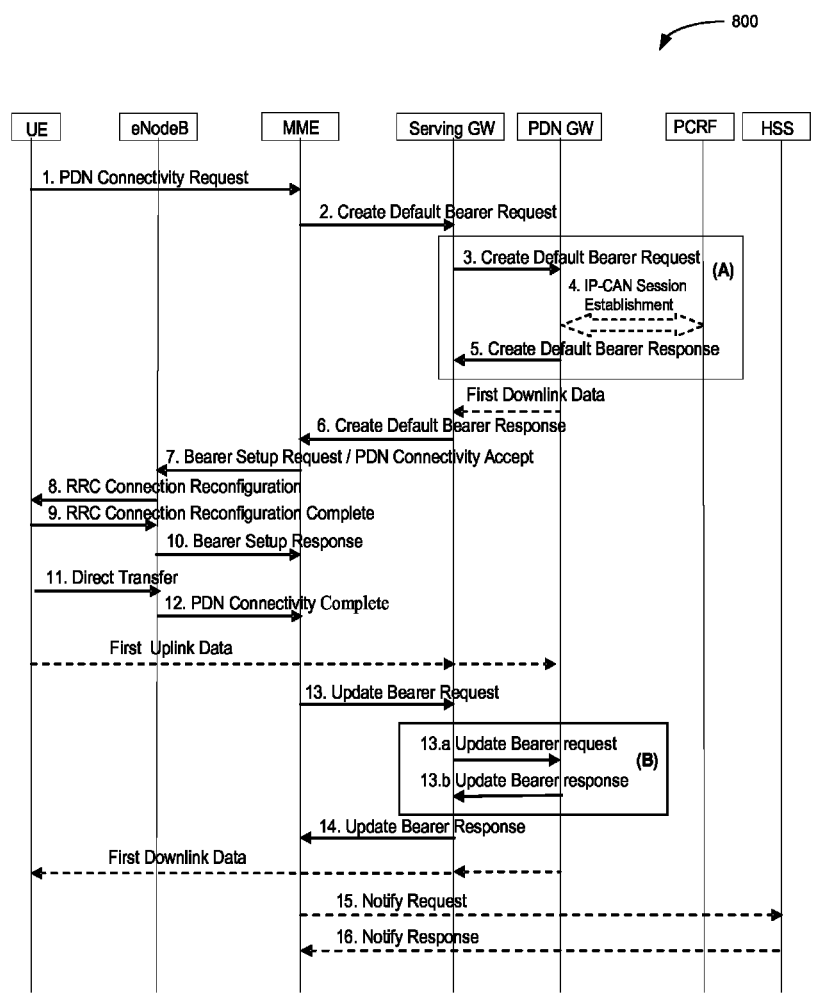
FIG. 8 illustrates a UE requested PDN connectivity procedure when the UE is on the GTP based 3GPP access network.

FIG. 8 illustrates a UE requested PDN connectivity procedure 800 for when the UE is on the GTP based 3GPP access network, as an example (similarly, the UE can perform different UE requested PDN connectivity procedure over other types of non-3GPP access networks). The UE also uses this procedure to request re-establishment of existing PDN connectivity upon handover from non-3GPP accesses. NOTE: For a PMIP-based S5/S8, procedure steps (A) are defined in TS 23.402. Steps 3, 4, and 5 concern GTP based S5/S8. The steps in (B) are executed only upon handover from non-3GPP access.

Referring to FIG. 8, in step 1, the UE initiates the UE Requested PDN procedure by the transmission of a PDN Connectivity Request (APN or Default APN indicator, PDN Type, Protocol Configuration Options, Request Type) message. If the UE was in ECM-IDLE mode, this NAS message is preceded by the Service Request procedure. PDN type indicates the requested IP version (IPv4, IPv4/v6, IPv6). The MME verifies that the APN provided by UE is allowed by subscription. If the UE provides an indicator requesting to use the Default APN instead of APN, the Default APN shall be used for the remainder of this procedure. Protocol Configuration Options (PCO) are used to transfer parameters between the UE and the PDN GW, and are sent transparently through the MME and the Serving GW. The Protocol Configuration Options may include the Address Allocation Preference, which indicates that the UE prefers to obtain an IPv4 address only after the default bearer activation by means of DHCPv4.

The Request Type indicates "initial request" if the UE requests new additional PDN connectivity over the 3GPP access network. In case of multiple PDN connections, the Request Type indicates "handover" when the UE is performing a handover from non-3GPP access and the UE has already established connectivity with the PDN over the non-3GPP access. An indicator for requesting use of the Default APN is to be defined during stage 3 works—e.g., a pre-defined string such as 'default' or lack of APN. This indicator should be known to all UEs. In one implementation, it's FFS whether the other values of the PDN Address Allocation and related use should be considered.

In step 2, if the Request Type indicates "Handover", the MME uses the PDN GW stored in the Subscription Data retrieved by the MME during the authentication performed at attach. If the Request Type indicates "initial attach" the MME selects a PDN GW as described in clause 4.3.8.1 on PDN GW Selection Function (3GPP accesses), allocates a Bearer Id, and sends a Create Default Bearer Request (IMSI, MSISDN, MME TEID for control plane, RAT type, PDN GW address, PDN Address, Default Bearer QoS, PDN Type, APN-AMBR, APN, EPS Bearer Id, Protocol Configuration Options, Handover Indication, ME Identity, User Location Information (ECGI), Selection Mode, Charging Characteristics, Trace Reference, Trace Type, Trigger Id, OMC Identity, Maximum APN Restriction, Dual Address Bearer Flag) message to the Serving GW.

The RAT type is provided in this message for the later PCC decision. The MSISDN is included if the MME has it stored for that UE. Handover Indication is included if the Request Type indicates "handover". Selection Mode indicates whether a subscribed APN was selected, or whether a non-subscribed APN sent by the UE or a non-subscribed APN chosen by the SGSN was selected. Selection Mode is set according to Annex A of TS 23.060 (which is incorporated herein by reference). The P-GW may use Selection Mode when deciding whether to accept or reject the default bearer activation. For example, if an APN requires subscription, the P-GW is configured to accept only the default bearer activation that requests a subscribed APN as indicated by Selection Mode. Charging Characteristics indicates which kind of charging the bearer context is liable for.

The charging characteristics for the PS subscription and individually subscribed APNs as well as the way of handling Charging Characteristics and whether to send them or not to the P-GW is defined in TS 32.251 (which is incorporated herein by reference). The MME shall include Trace Reference, Trace Type, Trigger Id, and OMC Identity if S-GW and/or P-GW trace is activated. The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type (see clause 15.4 of TS 23.060). If the P-GW receives the Maximum APN Restriction, then the P-GW shall check if the Maximum APN Restriction value does not conflict with the APN Restriction value associated with this bearer context request. If there is no conflict the request shall be allowed, otherwise the request shall be rejected with sending an appropriate error cause to the UE.

If the PDN subscription context contains a subscribed IPv4 address and/or IPv6 prefix, the MME indicates it in the PDN address. The Dual Address Bearer Flag shall be set when the PDN type is set to IPv4v6 and all SGSNs which the UE may be handed over to are Release 8 or above supporting dual addressing, which is determined based on node pre-configuration by the operator. If the UE request PDN type IPv4v6 but the subscription data only allow IPv4 or IPv6 IP address for this APN the MME will set the PDN type to IPv4 or IPv6 as indicated in subscription data. The Dual Address Bearer Flag is not used when the Protocol Type over S5/S8 is PMIP.

In step 3, the Serving GW creates a new entry in its EPS Bearer table and sends a Create Default Bearer Request (IMSI, MSISDN, Serving GW Address for the user plane, Serving GW TEID of the user plane, Serving GW TEID of the control plane, RAT type, Default Bearer QoS, PDN Type, PDN Address, APN-AMBR, APN, Bearer Id, Protocol Configuration Options, Handover Indication, ME Identity, User Location Information (ECGI), Selection Mode, Charging Characteristics, Trace Reference, Trace Type, Trigger Id, OMC Identity, Maximum APN Restriction, Dual Address Bearer Flag) message to the PDN GW indicated in the PDN GW address received in the previous step. After this step, the Serving GW buffers any downlink packets received from the PDN GW until receives the message in step 11 below. The MSISDN is included if received from the MME. If the Handover Indication is included, the Serving GW includes it in the Create Default Bearer Request message.

In step 4, if the Handover Indication is not present, the PDN GW may employ an IP-CAN Session Establishment procedure as defined in TS 23.203 with the PCRF to get the default PCC rules for the UE if PCRF is applied in the network. This may lead to the establishment of a number of dedicated bearers following the procedures defined in clause 5.4.1 in association with the establishment of the default bearer which is described in Annex F. The RAT type is provided to the PCRF by the PDN GW if received by the previous message. If the PDN GW/PCEF is configured to activate predefined PCC rules for the default bearer, the interaction with the PCRF is not required (e.g., operator may configure to do this) at the moment.

If the Handover Indication is present, the PDN GW executes a PCEF-Initiated IP-CAN Session Modification procedure with the PCRF as specified in TS 23.203 (which is incorporated herein by reference) to obtain the rules required for the PDN GW in the VPLMN or HPLMN to function as the PCEF for all the active sessions the UE has established with the new IP-CAN type as a result of the handover procedure. If the updated PCC rules require establishment of dedicated bearer for the UE, the establishment of those bearers takes place in combination with the default bearer as described in Annex F.

In step 5, the P-GW creates a new entry in its EPS bearer context table and generates a Charging Id. The new entry allows the P-GW to route user plane PDUs between the S-GW and the packet data network, and to start charging. The way the P-GW handles Charging Characteristics that it may have received is defined in TS 32.251 (which is incorporated herein by reference).

The PDN GW returns a Create Default Bearer Response (PDN GW Address for the user plane, PDN GW TEID of the user plane, PDN GW TEID of the control plane, PDN Type, PDN Address, EPS Bearer Id, Protocol Configuration Options, Charging Id, Prohibit Payload Compression, APN Restriction, Cause, CGI/SAI/RAI change report required, APN-AMBR) message to the Serving GW. The PDN GW takes into account the PDN type sent by the UE, the Dual Address Bearer Flag and the policies of operator when the PDN GW selects the PDN type to be used as follows.

If the UE has requested PDN type IPv4v6 and both IPv4 and IPv6 addressing are possible in the PDN but the Dual Address Bearer Flag is not set, or only single IP version addressing for this APN is possible in the PDN, the PDN GW selects a single IP version (either IPv4 or IPv6). If the UE has requested PDN type IPv4 or IPv6, the PDN GW uses the PDN type supplied by the UE in case it is supported in the PDN, otherwise an appropriate error cause will be returned.

The PDN GW allocates a PDN Address according to the selected PDN Type. In case the PDN GW has selected a PDN type different from the one sent by the UE, the PDN GW indicates together with the PDN type IE a reason cause (network preference, single address bearers only) to the UE why the PDN type has been modified. PDN Address may contain an IPv4 address for IPv4 and/or an IPv6 prefix and an Interface Identifier.

If the PDN has been configured by the operator so that the PDN addresses for the requested APN shall be allocated by usage of DHCPv4 only, or if the PDN GW allows the UE to use DHCPv4 for address allocation according to the Address Allocation Preference received from the UE, the PDN Address shall be set to 0.0.0.0, indicating that the IPv4 address shall be negotiated by the UE with after completion of the Default Bearer Activation procedure. In case of external PDN addressing for IPv6, the PDN GW obtains the IPv6 prefix from the external PDN using either RADIUS or Diameter client function. In the PDN Address field of the Create Default Bearer Response, the PDN GW includes the Interface Identifier and IPv6 prefix. The PDN GW sends Router Advertisement to the UE after default bearer establishment with the IPv6 prefix information for all cases.

If the PDN address is contained in the Create Default Bearer Request, the PDN GW shall allocate the IPv4 address and/or IP6 prefix contained in the PDN address to the UE. If Handover Indication indicates "Handover", the PDN Address Information shall contain the same IP address the UE obtained during PDN connectivity establishment over the non-3GPP access. Protocol Configuration Options contains the BCM as well as optional PDN parameters that the P-GW may transfer to the UE. These optional PDN parameters may be requested by the UE, or may be sent unsolicited by the P-GW. Protocol Configuration Options are sent transparently through the MME. When the Handover Indication is present, the PDN GW does not yet send downlink packets to the SGW; the downlink path is to be switched at step 11a.

In step 6, if the CGI/SAI/RAI change report required is received for this bearer context, then the S-GW shall store this for the bearer context and the S-GW shall report to that P-GW whenever a CGI/SAI/RAI change occurs that meets the P-GW request, as described in clause 15.1.1a of TS 23.060.

The Serving GW returns a Create Default Bearer Response (PDN Type, PDN Address, Serving GW address for User Plane, Serving GW TEID for User Plane, Serving GW TEID for control plane, EPS Bearer Id, Protocol Configuration Options, Charging Id, Prohibit Payload Compression, APN Restriction, Cause, CGI/SAI/RAI change report required, APN-AMBR) message to the MME. The DL TFT for PMIP-based S5/S8 is obtained from interaction between the Serving GW and the PCRF as described in clause 5.6.1 of TS 23.402, when PCC is deployed; otherwise, the DL TFT IE is wild-carded, matching any downlink traffic. If the UE indicates the Request Type as "Handover", this message also serves as an indication to the MME that the S5 bearer setup and update has been successful. At this step the GTP tunnel(s) over S5 are established.

In step 7, if an APN Restriction is received, then the MME shall store this value for the Bearer Context and the MME shall check this received value with the stored value for the Maximum APN Restriction to ensure there are no conflicts between values. If the consequence of this check results in the PDN connectivity being rejected, the MME shall initiate a Bearer Deactivation and return an appropriate error cause. If the PDN Connectivity Request is accepted, the MME shall determine a (new) value for the Maximum APN Restriction. If there is no previously stored value for Maximum APN Restriction, then the Maximum APN Restriction shall be set to the value of the received APN Restriction.

If the CGI/SAI/RAI change report required is received for this bearer context, then the MME shall store this for the bearer context and the MME shall report whenever a CGI/SAI/RAI change occurs that meets the request, as described in clause 15.1.1a of TS 23.060. The MME may need to modify the UE AMBR, which has been assigned to the eNB, based on the subscribed UE-AMBR and the updated set of APN-AMBRs in use. The principles to determine the UE-AMBR are described in clause 4.7.3.

The MME sends PDN Connectivity Accept (APN, PDN Type, PDN Address, EPS Bearer Id, Session Management Configuration, Session Management Request, Protocol Configuration Options) message to the eNodeB. This message is contained in an S1_MME control message Bearer Setup Request (EPS Bearer QoS, UE-AMBR, PDN Connectivity Accept, S1-TEID). This S1 control message includes the TEID at the Serving GW used for user plane and the address of the Serving GW for user plane. In the PDN Connectivity Accept message, the MME does not include the IPv6 prefix within the PDN Address. The MME includes the APN-AMBR and the EPS Bearer QoS parameter QCI into the Session Management Request.

Furthermore, if the UE has UTRAN or GERAN capabilities, the MME uses the EPS bearer QoS information to derive the corresponding PDP context parameters QoS Negotiated (R99 QoS profile), Radio Priority, Packet Flow Id and TI and includes them in the Request. If the UE indicated in the UE Network Capability that the UE does not support BSS packet flow procedures, then the MME shall not include the Packet Flow Id. MME will not send the S1 Bearer Setup Request message until any outstanding S1 Bearer Setup Response message for the same UE has been received or timed out. If the APN-AMBR has changed the MME may update the UE-AMBR if appropriate. The MME may provide the eNodeB with Handover Restriction List. Handover Restriction List is described in clause 4.3.5.7 "Mobility Restrictions". If the MME has changed the PDN Type based on the user subscription the MME will add a reason cause of "subscription limitation" and return to the UE.

In step 8, the eNodeB sends RRC Connection Reconfiguration to the UE including the PDN Connectivity Accept message. The UE shall store the QoS Negotiated, Radio Priority, Packet Flow Id and TI, which the UE received in the Session Management Configuration IE, for use when accessing via GERAN or UTRAN. The UE may provide EPS Bearer QoS parameters to the application handling the traffic flow. The application usage of the EPS Bearer QoS is implementation dependent. In one implementation, the UE shall not reject the RRC Connection Reconfiguration on the basis of the EPS Bearer QoS parameters contained in the Session Management Request.

If the UE receives an IPv4 address set to 0.0.0.0, it may negotiate the IPv4 address with DHCPv4 as specified in TS 29.061 (which is incorporated herein by reference), If the UE receives an IPv6 interface identifier, the UE may wait for the Router Advertisement from the network with the IPv6 prefix information or the UE may send a Router Solicitation if necessary. The IP address allocation details are described in clause 5.3.1 on "IP Address Allocation".

In step 9, the UE sends the RRC Connection Reconfiguration Complete to the eNodeB. In step 10, the eNodeB send an S1-AP Bearer Setup Response to the MME. The S1-AP message includes the TEID of the eNodeB and the address of the eNodeB used for downlink traffic on the S1_U reference point. In step 11, the UE NAS layer builds a PDN Connectivity Complete message including EPS Bearer Identity. The UE then sends a Direct Transfer (PDN Connectivity Complete) message to the eNodeB.

In step 12, the eNodeB sends an Uplink NAS Transport (PDN Connectivity Complete) message to the MME. After the PDN Connectivity Accept message and once the UE has obtained a PDN Address Information, the UE can then send uplink packets towards the eNodeB which will then be tunneled to the Serving GW and PDN GW. If the UE requested for a dual address PDN type (IPv4v6) to a given APN and was granted a single address PDN type (IPv4 or IPv6) by the network with a reason cause "single address bearers only", the UE may request for the activation of a parallel PDN connection to the same APN with a single address PDN type (IPv4 or IPv6) other than the one already activated. If the UE receives no reason cause in step 8 in response to a IPv4v6 PDN type and the UE receives an IPv6 prefix and Interface Identifier apart from the IPv4 address or 0.0.0.0 in the PDN Address field, the UE considers that the request for a dual address PDN was successful. The UE can wait for the Router Advertisement from the network with the IPv6 prefix information or the UE may send a Router Solicitation if necessary.

In step 13, upon reception of the Bearer Setup Response message in step 10 and the PDN Connectivity Complete message in step 12, the MME sends an Update Bearer Request (eNodeB address, eNodeB TEID, Handover Indication) message to the Serving GW. If Request Type indicates "handover", the Handover Indication is also included. In step 13*a*, if the Handover Indication is included in step 11, the Serving GW sends an Update Bearer Request (Handover Indication) message to the PDN GW to prompt the PDN GW to tunnel packets from non 3GPP IP access to 3GPP access system and immediately start routing packets to the Serving GW for the default and any dedicated EPS bearers established. In step 13*b*, the PDN GW acknowledges by sending Update Bearer Response to the Serving GW.

In step 14, the Serving GW acknowledges by sending Update Bearer Response (EPS Bearer Identity) to the MME.

The Serving GW can then send its buffered downlink packets. EPS Bearer Identity is included if the Request Type indicates "handover".

In step 15, after the MME receives Update Bearer Response in step 13, if Request type does not indicate handover and an EPS bearer was established and if the subscription data indicates that the user is allowed to perform handover to non-3GPP accesses and if this is the first PDN connection associated with this APN and if the MME selected a PDN GW that is different from the PDN GW identity which was previously indicated by the HSS in the PDN subscription context, the MME sends an Update Location Request including the PDN GW address and the APN to the HSS for mobility with non-3GPP accesses.

In step 16, the HSS stores the PDN GW identity and the associated APN, and sends an Update Location Response to the MME.

As shown in the procedure 800 of FIG. 8, the UE can indicate to the network either an "initial attach" or "handover" by setting the Request Type as different values. However, in the scenario as shown in FIG. 7, the UE cannot indicate either "initial attach" or "handover" because if the Request Type is "initial attach", the network will select a PDN GW that may be different from the PDN GW 1 to serve the same APN; furthermore, the network may allocate a different IP address from that used with the PDN GW 1. This is not a desired behavior as a UE cannot use IP flow mobility schemes—for example, as described in IETF draft draft-ietf-monami6-multiplecoa-08 and IETF draft draft-ietf-mext-flow-binding-00 (both of which are incorporated herein by reference)—with the PDN GW1. On the other hand, if the Request Type indicates "handover", the network will transfer connectivity to the PDN GW 1 from the access 1 to the access 2, which is not what the UE wants either.

Similar issues also exist when the UE performs the UE requested PDN connectivity procedure over other access networks, such as the PMIP based 3GPP, and trusted/untrusted non3GPP access networks. Discussed below are techniques and mechanisms to enable the UE to set up additional connectivity to an already connected PDN GW while maintaining connectivity to multiple PDNs.

Attach Type Based Indication

In one aspect, this disclosure describes an extension to the UE requested PDN connectivity procedure by providing a different indication from "initial attach" and "handover". Such indication can be a different value set to the Request Type, for example, this value can be called as "Additional Attach". Below are procedures performed by the UE over different types of access networks to set up additional connectivity to the existing PDN GW in order to exchange different flows simultaneously over different access networks. Note that the information regarding what flows should be forwarded over which access is carried in signaling messages exchanged between the UE and the network. For example, to describe certain flows, some Protocol Configuration Options (PCO) carried in the GTP/PMIP messages and some mobility options carried in the PMIP messages and other fields/payloads can be defined to describe flows, such as a tuple of source IP address, destination IP address, protocol type, source port number, destination port number and so on. Such PCOs and mobility options can be included in the signaling messages as shown and described as flow information in various following procedures.

1) Over the GTP Based 3GPP Access Network

Figure 9:
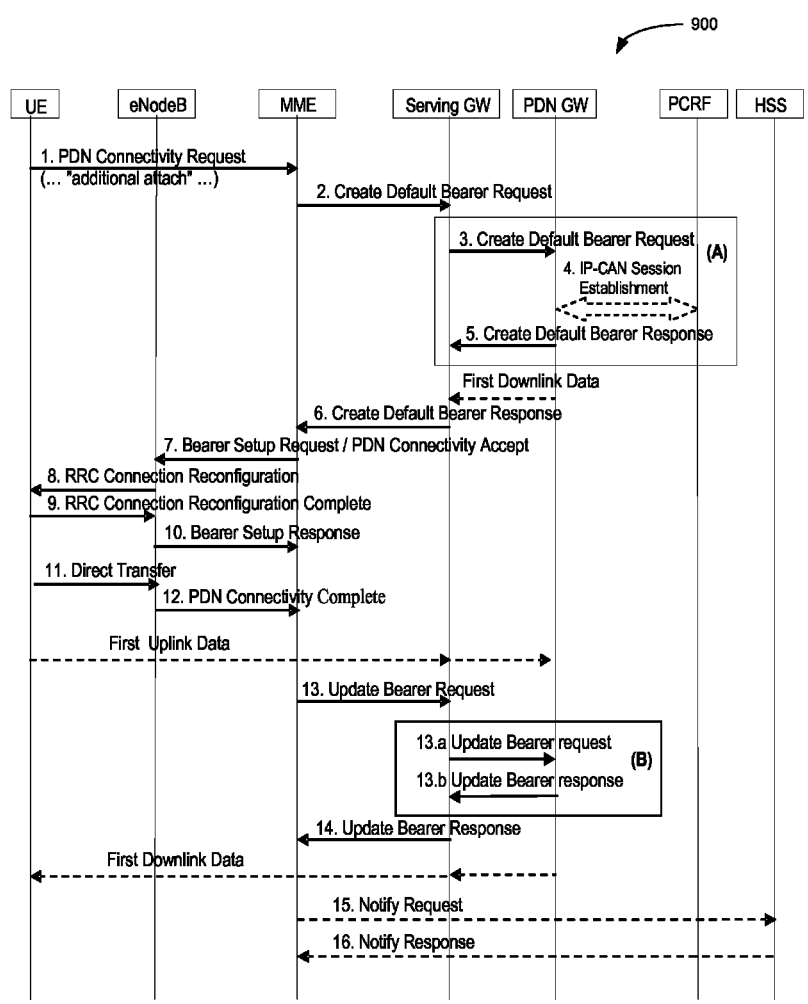
FIG. 9 illustrates a UE requested PDN connectivity procedure including an "additional attach" indication on the GTP based 3GPP access.

FIG. 9 illustrates a UE requested PDN connectivity procedure 900 including an "additional attach" indication on the GTP based 3GPP access. For a PMIP-based S5/S8, procedure steps (A) are defined in TS 23.402. Steps 3, 4, and 5 concern GTP based S5/S8. The UE can use the procedure 900 to request re-establishment of existing PDN connectivity upon handover from non-3GPP accesses. The steps in (B) are executed only upon handover from non-3GPP access.

In step 1, the UE initiates the UE Requested PDN procedure by the transmission of a PDN Connectivity Request (APN or Default APN indicator, PDN Type, Protocol Configuration Options, Request Type, flow information) message. If the UE was in ECM-IDLE mode, this NAS message is preceded by the Service Request procedure. PDN type indicates the requested IP version (IPv4, IPv4/v6, IPv6). The MME verifies that the APN provided by UE is allowed by subscription. If the UE provides an indicator requesting to use the Default APN instead of APN, the Default APN shall be used for the remainder of this procedure. Protocol Configuration Options (PCO) are used to transfer parameters between the UE and the PDN GW, and are sent transparently through the MME and the Serving GW.

The Protocol Configuration Options may include the Address Allocation Preference, which indicates that the UE prefers to obtain an IPv4 address only after the default bearer activation by means of DHCPv4. The Request Type indicates "initial request" if the UE requests new additional PDN connectivity over the 3GPP access network. In case of multiple PDN connections, the Request Type indicates "handover" when the UE is performing a handover from non-3GPP access and the UE has already established connectivity with the PDN over the non-3GPP access. The Request Type indicates "additional attach" when the UE wants to set up additional connectivity to the already connected PDN GW so as to exchange different flows over different access networks, including the GTP based 3GPP access network.

The flow information can be carried in certain PCOs and used to describe certain flows that the UE wants to be transferred over the GTP based EUTRAN. An indicator for requesting use of the Default APN is to be defined during stage 3 works—e.g., a pre-defined string such as 'default' or lack of APN. This indicator should be known to all UEs. It's FFS whether the other values of the PDN Address Allocation and related use should be considered.

In step 2, if the Request Type indicates "Handover" or "additional attach", the MME uses the PDN GW stored in the Subscription Data retrieved by the MME during the authentication performed at attach. If the Request Type indicates "initial attach" the MME selects a PDN GW as described in clause 4.3.8.1 on PDN GW Selection Function (3GPP accesses), allocates a Bearer Id, and sends a Create Default Bearer Request WSI, MSISDN, MME TEID for control plane, RAT type, PDN GW address, PDN Address, Default Bearer QoS, PDN Type, APN-AMBR, APN, EPS Bearer Id, Protocol Configuration Options, Handover Indication, Additional Attach Indication, ME Identity, User Location Information (ECGI), Selection Mode, Charging Characteristics, Trace Reference, Trace Type, Trigger Id, OMC Identity, Maximum APN Restriction, Dual Address Bearer Flag, flow information) message to the Serving GW.

The RAT type is provided in this message for the later PCC decision. The MSISDN is included if the MME has it stored for that UE. Handover Indication is included if the Request Type indicates "handover". Additional Attach Indication is included if the Request Type indicates "additional attach". Selection Mode indicates whether a subscribed APN was selected, or whether a non-subscribed APN sent by the UE or a non-subscribed APN chosen by the SGSN was selected. Selection Mode is set according to Annex A of TS 23.060. The P-GW may use Selection Mode when deciding whether to accept or reject the default bearer activation. For example, if an APN requires subscription, the P-GW is configured to accept only the default bearer activation that requests a subscribed APN as indicated by Selection Mode. Charging Characteristics indicates which kind of charging the bearer context is liable for.

The charging characteristics for the PS subscription and individually subscribed APNs as well as the way of handling Charging Characteristics and whether to send them or not to the P-GW is defined in TS 32.251. The MME shall include Trace Reference, Trace Type, Trigger Id, and OMC Identity if S-GW and/or P-GW trace is activated. The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type (see clause 15.4 of TS 23.060). If the P-GW receives the Maximum APN Restriction, then the P-GW shall check if the Maximum APN Restriction value does not conflict with the APN Restriction value associated with this bearer context request. If there is no conflict the request shall be allowed, otherwise the request shall be rejected with sending an appropriate error cause to the UE.

If the PDN subscription context contains a subscribed IPv4 address and/or IPv6 prefix, the MME indicates it in the PDN address. The Dual Address Bearer Flag shall be set when the PDN type is set to IPv4v6 and all SGSNs which the UE may be handed over to are Release 8 or above supporting dual addressing, which is determined based on node pre-configuration by the operator. If the UE request PDN type IPv4v6 but the subscription data only allow IPv4 or IPv6 IP address for this APN the MME will set the PDN type to IPv4 or IPv6 as indicated in subscription data. Note: the Dual Address Bearer Flag is not used when the Protocol Type over S5/S8 is PMIP.

In step 3, the Serving GW creates a new entry in its EPS Bearer table and sends a Create Default Bearer Request (IMSI, MSISDN, Serving GW Address for the user plane, Serving GW TEID of the user plane, Serving GW TEID of the control plane, RAT type, Default Bearer QoS, PDN Type, PDN Address, APN-AMBR, APN, Bearer Id, Protocol Configuration Options, Handover Indication, Additional Attach Indication, ME Identity, User Location Information (ECGI), Selection Mode, Charging Characteristics, Trace Reference, Trace Type, Trigger Id, OMC Identity, Maximum APN Restriction, Dual Address Bearer Flag, flow information) message to the PDN GW indicated in the PDN GW address received in the previous step. After this step, the Serving GW buffers any downlink packets it may receive from the PDN GW until receives the message in step 11 below. The MSISDN is included if received from the MME. If the Handover Indication is included, the Serving GW includes it in the Create Default Bearer Request message.

In step 4, if the Handover Indication is not present, the PDN GW may employ an IP-CAN Session Establishment procedure as defined in TS 23.203 with the PCRF to get the default PCC rules for the UE if PCRF is applied in the network. This may lead to the establishment of a number of dedicated bearers following the procedures defined in clause 5.4.1 in association with the establishment of the default bearer which is described in Annex F. The RAT type is provided to the PCRF by the PDN GW if received by the previous message. If the PDN GW/PCEF is configured to activate predefined PCC rules for the default bearer, the interaction with the PCRF is not required (e.g., operator may configure to do this) at the moment.

If the Handover Indication or Additional Attach Indication is present, the PDN GW executes a PCEF-Initiated IP-CAN Session Modification procedure with the PCRF as specified in TS 23.203 to obtain the rules required for the PDN GW in the VPLMN or HPLMN to function as the PCEF for all the active sessions the UE has established with the new IP-CAN type as a result of the handover procedure. If the updated PCC rules require establishment of dedicated bearer for the UE, the establishment of those bearers takes place in combination with the default bearer as described in Annex F.

In step 5, the P-GW creates a new entry in its EPS bearer context table and generates a Charging Id. The new entry allows the P-GW to route user plane PDUs between the S-GW and the packet data network, and to start charging. The way the P-GW handles Charging Characteristics that it may have received is defined in TS 32.251.

The PDN GW returns a Create Default Bearer Response (PDN GW Address for the user plane, PDN GW TEID of the user plane, PDN GW TEID of the control plane, PDN Type, PDN Address, EPS Bearer Id, Protocol Configuration Options, Charging Id, Prohibit Payload Compression, APN Restriction, Cause, CGI/SAI/RAI change report required, APN-AMBR) message to the Serving GW. The PDN GW takes into account the PDN type sent by the UE, the Dual Address Bearer Flag and the policies of operator when the PDN GW selects the PDN type to be used as follows.

If the UE has requested PDN type IPv4v6 and both IPv4 and IPv6 addressing are possible in the PDN but the Dual Address Bearer Flag is not set, or only single IP version addressing for this APN is possible in the PDN, the PDN GW selects a single IP version (either IPv4 or IPv6). If the UE has requested PDN type IPv4 or IPv6, the PDN GW uses the PDN type supplied by the UE in case it is supported in the PDN, otherwise an appropriate error cause will be returned. The PDN GW allocates a PDN Address according to the selected PDN Type.

In case the PDN GW has selected a PDN type different from the one sent by the UE, the PDN GW indicates together with the PDN type IE a reason cause (network preference, single address bearers only) to the UE why the PDN type has been modified. PDN Address may contain an IPv4 address for IPv4 and/or an IPv6 prefix and an Interface Identifier.

If the PDN has been configured by the operator so that the PDN addresses for the requested APN shall be allocated by usage of DHCPv4 only, or if the PDN GW allows the UE to use DHCPv4 for address allocation according to the Address Allocation Preference received from the UE, the PDN Address shall be set to 0.0.0.0, indicating that the IPv4 address shall be negotiated by the UE with after completion of the Default Bearer Activation procedure. In case of external PDN addressing for IPv6, the PDN GW obtains the IPv6 prefix from the external PDN using either RADIUS or Diameter client function. In the PDN Address field of the Create Default Bearer Response, the PDN GW includes the Interface Identifier and IPv6 prefix. The PDN GW sends Router Advertisement to the UE after default bearer establishment with the IPv6 prefix information for all cases.

If the PDN address is contained in the Create Default Bearer Request, the PDN GW shall allocate the IPv4 address and/or IP6 prefix contained in the PDN address to the UE. If Handover Indication indicates "Handover" or Additional Attach Indication indicates "additional attach", the PDN Address Information shall contain the same IP address the UE obtained during PDN connectivity establishment over the non-3GPP access. Protocol Configuration Options contains the BCM as well as optional PDN parameters that the P-GW may transfer to the UE. These optional PDN parameters may be requested by the UE, or may be sent unsolicited by the P-GW. Protocol Configuration Options are sent transparently through the MME. When the Handover Indication is present, the PDN GW does not yet send downlink packets to the SGW; the downlink path is to be switched at step 11*a*.

In step 6, if the CGI/SAI/RAI change report required is received for this bearer context, then the S-GW shall store this for the bearer context and the S-GW shall report to that P-GW whenever a CGI/SAI/RAI change occurs that meets the P-GW request, as described in clause 15.1.1a of TS 23.060.

The Serving GW returns a Create Default Bearer Response (PDN Type, PDN Address, Serving GW address for User Plane, Serving GW TEID for User Plane, Serving GW TEID for control plane, EPS Bearer Id, Protocol Configuration Options, Charging Id, Prohibit Payload Compression, APN Restriction, Cause, CGI/SAI/RAI change report required, APN-AMBR) message to the MME. The DL TFT for PMIP-based S5/S8 is obtained from interaction between the Serving GW and the PCRF as described in clause 5.6.1 of TS 23.402, when PCC is deployed; otherwise, the DL TFT IE is wild-carded, matching any downlink traffic. If the UE indicates the Request Type as "Handover" or "additional attach", this message also serves as an indication to the MME that the S5 bearer setup and update has been successful. At this step the GTP tunnel(s) over S5 are established.

In step 7, if an APN Restriction is received, then the MME shall store this value for the Bearer Context and the MME shall check this received value with the stored value for the Maximum APN Restriction to ensure there are no conflicts between values. If the consequence of this check results in the PDN connectivity being rejected, the MME shall initiate a Bearer Deactivation and return an appropriate error cause. If the PDN Connectivity Request is accepted, the MME shall determine a (new) value for the Maximum APN Restriction. If there is no previously stored value for Maximum APN Restriction, then the Maximum APN Restriction shall be set to the value of the received APN Restriction.

If the CGI/SAI/RAI change report required is received for this bearer context, then the MME shall store this for the bearer context and the MME shall report whenever a CGI/SAI/RAI change occurs that meets the request, as described in clause 15.1.1a of TS 23.060. The MME may need to modify the UE AMBR, which has been assigned to the eNB, based on the subscribed UE-AMBR and the updated set of APN-AMBRs in use. The principles to determine the UE-AMBR are described in clause 4.7.3.

The MME sends PDN Connectivity Accept (APN, PDN Type, PDN Address, EPS Bearer Id, Session Management Configuration, Session Management Request, Protocol Configuration Options) message to the eNodeB. This message is contained in an S1_MME control message Bearer Setup Request (EPS Bearer QoS, UE-AMBR, PDN Connectivity Accept, S1-TEID). This S1 control message includes the TEID at the Serving GW used for user plane and the address of the Serving GW for user plane. In the PDN Connectivity Accept message, the MME does not include the IPv6 prefix within the PDN Address. The MME includes the APN-AMBR and the EPS Bearer QoS parameter QCI into the Session Management Request. Furthermore, if the UE has UTRAN or GERAN capabilities, the MME uses the EPS bearer QoS information to derive the corresponding PDP context parameters QoS Negotiated (R99 QoS profile), Radio Priority, Packet Flow Id and TI and includes them in the Request.

If the UE indicated in the UE Network Capability that it does not support BSS packet flow procedures, then the MME shall not include the Packet Flow Id. MME will not send the S1 Bearer Setup Request message until any outstanding S1 Bearer Setup Response message for the same UE has been received or timed out. If the APN-AMBR has changed the MME may update the UE-AMBR if appropriate. The MME may provide the eNodeB with Handover Restriction List. Handover Restriction List is described in clause 4.3.5.7 "Mobility Restrictions". If the MME has changed the PDN Type based on the user subscription, the MME will add a reason cause of "subscription limitation" and return to the UE.

In step 8, the eNodeB sends RRC Connection Reconfiguration to the UE including the PDN Connectivity Accept message. The UE shall store the QoS Negotiated, Radio Priority, Packet Flow Id and TI, which the UE received in the Session Management Configuration IE, for use when accessing via GERAN or UTRAN. The UE may provide EPS Bearer QoS parameters to the application handling the traffic flow. The application usage of the EPS Bearer QoS is implementation dependent. In one implementation, the UE shall not reject the RRC Connection Reconfiguration on the basis of the EPS Bearer QoS parameters contained in the Session Management Request.

If the UE receives an IPv4 address set to 0.0.0.0, it may negotiate the IPv4 address with DHCPv4 as specified in TS 29.061. If the UE receives an IPv6 interface identifier, the UE may wait for the Router Advertisement from the network with the IPv6 prefix information or the UE may send a Router Solicitation if necessary. The IP address allocation details are described in clause 5.3.1 on "IP Address Allocation".

In step 9, the UE sends the RRC Connection Reconfiguration Complete to the eNodeB. In step 10, the eNodeB send an S1-AP Bearer Setup Response to the MME. The S1-AP message includes the TEID of the eNodeB and the address of the eNodeB used for downlink traffic on the S1_U reference point. In step 11, the UE NAS layer builds a PDN Connectivity Complete message including EPS Bearer Identity. The UE then sends a Direct Transfer (PDN Connectivity Complete) message to the eNodeB.

In step 12, the eNodeB sends an Uplink NAS Transport (PDN Connectivity Complete) message to the MME. After the PDN Connectivity Accept message and once the UE has obtained a PDN Address Information, the UE can then send uplink packets towards the eNodeB which will then be tunneled to the Serving GW and PDN GW. If the UE requested for a dual address PDN type (IPv4v6) to a given APN and was granted a single address PDN type (IPv4 or IPv6) by the network with a reason cause "single address bearers only", the UE may request for the activation of a parallel PDN connection to the same APN with a single address PDN type (IPv4 or IPv6) other than the one already activated. If the UE receives no reason (or cause) in step 8 in response to a IPv4v6 PDN type and the UE receives an IPv6 prefix and Interface Identifier apart from the IPv4 address or 0.0.0.0 in the PDN Address field, the UE considers that the request for a dual address PDN was successful. The UE can wait for the Router Advertisement from the network with the IPv6 prefix information or the UE may send a Router Solicitation if necessary.

In step 13, upon reception of the Bearer Setup Response message in step 10 and the PDN Connectivity Complete message in step 12, the MME sends an Update Bearer Request (eNodeB address, eNodeB TEID, Handover Indication) message to the Serving GW. If Request Type indicates "handover", the Handover Indication is also included. In step 13*a*, if the Handover Indication is included in step 11, the Serving GW sends an Update Bearer Request (Handover Indication) message to the PDN GW to prompt the PDN GW to tunnel packets from non 3GPP IP access to 3GPP access system and immediately start routing packets to the Serving GW for the default and any dedicated EPS bearers established. In step 13*b*, the PDN GW acknowledges by sending Update Bearer Response to the Serving GW.

In step 14, the Serving GW acknowledges by sending Update Bearer Response (EPS Bearer Identity) to the MME. The Serving GW can then send its buffered downlink packets. EPS Bearer Identity is included if the Request Type indicates "handover".

In step 15, after the MME receives Update Bearer Response in step 13, if Request type does not indicate handover and an EPS bearer was established and if the subscription data indicates that the user is allowed to perform handover to non-3GPP accesses and if this is the first PDN connection associated with this APN and if the MME selected a PDN GW that is different from the PDN GW identity which was previously indicated by the HSS in the PDN subscription context, the MME shall send an Update Location Request including the PDN GW address and the APN to the HSS for mobility with non-3GPP accesses.

In step 16, the HSS stores the PDN GW identity and the associated APN, and sends an Update Location Response to the MME. Note: for handover from non-3GPP access, the PDN GW initiates resource allocation deactivation procedure in the trusted/untrusted non-3GPP IP access as specified in TS 23.402.

2) Over the PMIP Based 3GPP Access Network

Figure 10:
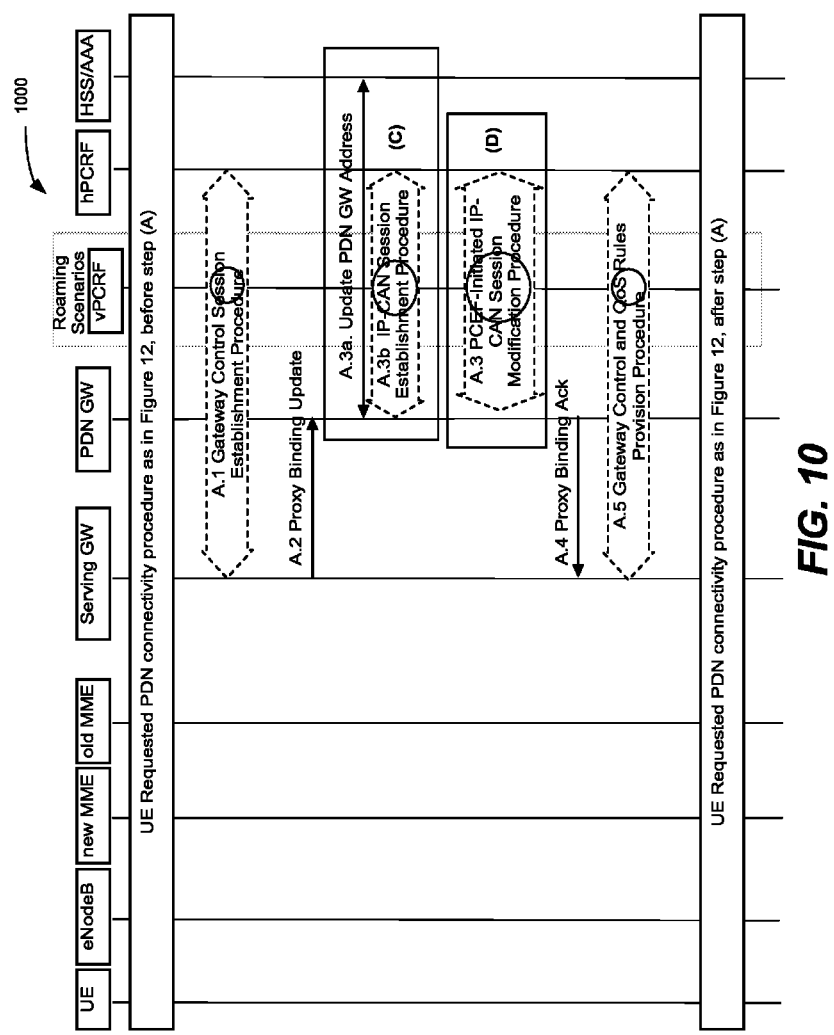
FIG. 10 illustrates a UE requested PDN connectivity procedure including an "additional attach" indication on the PMIP based 3GPP access.

FIG. 10 illustrates a UE requested PDN connectivity procedure 1000 including an "additional attach" indication on the PMIP based 3GPP access. The procedure for when the UE wants to request PDN connectivity on the PMIP based 3GPP access network is similar to the procedure 900 discussed above. Note that in A.2 Proxy Binding Update and A.4 Proxy Binding Ack, the Additional Attach indication is present if the UE sets the Request Type as "additional attach" before and the flow information may be included.

3) Over Trusted Non 3GPP Access Network with PMIP

Figure 11:
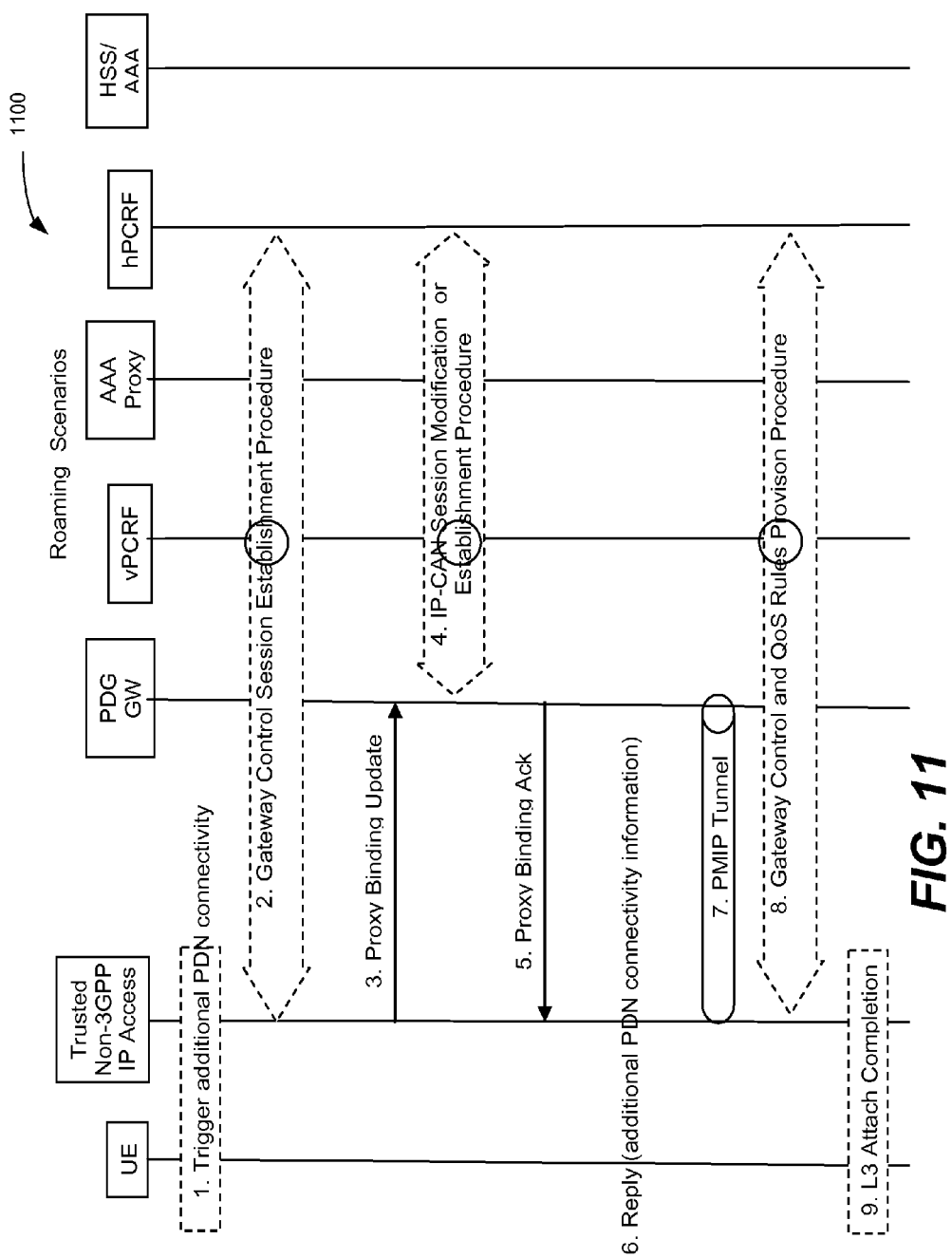
FIG. 11 illustrates a UE requested PDN connectivity procedure including an "additional attach" indication on the PMIP based trusted non3GPP access.

FIG. 11 illustrates a UE requested PDN connectivity procedure 1100 including an "additional attach" indication on the PMIP based trusted non3GPP access.

In step 1, when the UE wishes to connect to an additional PDN over an access network, the UE sends a trigger indicating that connectivity with that specific PDN is desired. The UE provides information about the new PDN by using an APN. The UE triggers the re-establishment of existing PDN connectivity after the handover by providing a Request Type indicating "Handover" on accesses that support the indication. The UE provides a Request Type indicating "Additional attach" and flow information on the access that supports this indications if the UE wants to set up additional connectivity to an already connected PDN GW and exchange different flows over different access networks simultaneously. Note: the definition of the trigger that the UE provides to the access network (MAG) is out of scope of 3GPP, and accordingly any suitable conventional trigger scheme can be implemented.

In step 2, the Trusted non-3GPP access initiates the Gateway Control Session Establishment Procedure with the PCRF, as specified in TS 23.203. The Trusted non-3GPP access provides the information to the PCRF to correctly associate it with the IP-CAN session to be established or modified in step 4 and also to convey subscription related parameters to the PCRF. Note that if the Request Type indicates "additional attach" the trusted non-3gpp access network does not select a new PDN GW but uses an exist PDN GW corresponding to the provided APN.

In step 3, the MAG function of Trusted Non-3GPP IP Access sends a Proxy Binding Update (MN-NAI, Lifetime, Access Technology Type, Handover Indicator, Additional Attach Indicator, APN, GRE key for downlink traffic, Additional Parameters, flow information) message to PDN GW. The MN NAI identifies the UE. The Lifetime field must be set to a nonzero value in the case of a registration and a zero value in the case of a de-registration. Access Technology Type is set to a value matching the characteristics of the non-3GPP access. Handover Indicator is set to "initial" attach if the UE has provided Attach Type indicating "Initial" attach or if the Attach Type indicates "Handover" and the PDN subscription profile contains no PDN GW. The Additional Parameters may include Protocol Configuration Options and other information. If the Request Type indicates "additional attach", an additional attach indication is also carried in the Proxy Binding Update message.

In step 4, the PDN GW initiates the IP-CAN Session Modification or Establishment Procedure with the PCRF, as specified in TS 23.203. The PDN GW provides information to the PCRF used to identify the session and associate Gateway Control Sessions established in step 2 correctly. The PCRF creates IP-CAN session related information and responds to the PDN GW with PCC rules and event triggers. If the Request type indicates "additional attach", the PDN GW is not changed. Therefore, the PDN GW does not need to informs the 3GPP AAA Server of its PDN GW identity and the APN corresponding to the UE's PDN Connection or register in the HSS, since such information is already stored in the network.

In step 5, the PDN GW processes the proxy binding update and creates a binding cache entry for the UE. The PDN GW allocates IP address(es) for the UE. The PDN GW then sends a Proxy Binding Acknowledgement (MN NAI, Lifetime, UE Address Info, GRE key for uplink traffic, Additional Parameters) message to the MAG function in Trusted Non-3GPP IP Access, including the IP address(es) allocated for the UE. The UE Address Info includes one or more IP addresses. The Lifetime indicates the duration of the binding. The Additional Parameters may include Protocol Configuration Options and other information. If UE requests for both IPv4 and IPv6 addresses, both are allocated. If the UE requests for only IPv4 or IPv6 address only one address is allocated accordingly.

In step 6, the trusted non-3GPP access system sends the reply message to the UE with the allocated IP address from the PDN that the UE indicated at step 1. Since UE requested for additional PDN connectivity, the UE configures the IP address received from the MAG without deleting its configuration for connectivity with any other previously established PDN. For handover or the Request type indicates "additional attach", the UE is returned the same IP address the UE obtained during PDN connectivity establishment over the 3GPP access. Note: the definition of the message used to carry the new connectivity information to the UE is out of scope of 3GPP, accordingly any suitable message can be implemented.

In step 7, the PMIPv6 tunnel is thus set up between the Trusted Non-3GPP IP Access and the PDN GW corresponding to the requested additional PDN while maintaining tunnels previously established for other PDNs. In step 8, the PCRF may update the QoS rules in the trusted non-3GPP access by initiating the GW Control Session Modification Procedure, as specified in TS 23.203. In step 9, L3 attach procedure is completed via non-3GPP access specific trigger. IP connectivity between the UE and the PDN GW is set for uplink and downlink directions. At this step the IP address information is provided to the UE.

4) Over Untrusted Non 3GPP Access Network with PMIP

Figure 12:
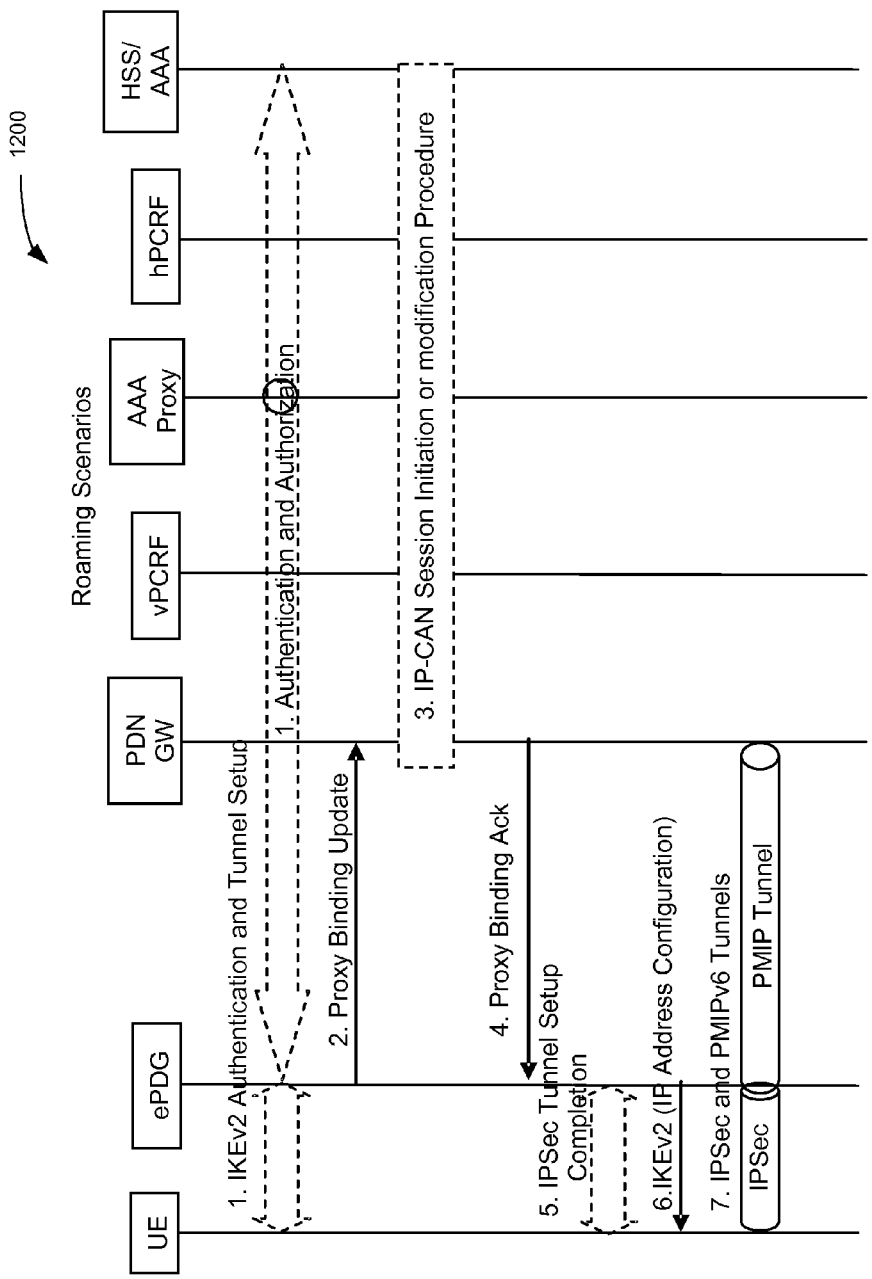
FIG. 12 illustrates a UE requested PDN connectivity procedure including an "additional attach" indication on the PMIP based untrusted non3GPP access.

FIG. 12 illustrates a UE requested PDN connectivity procedure 1200 including an "additional attach" indication on the PMIP based untrusted non3GPP access.

In step 1, the IKEv2 tunnel establishment procedure is started by the UE. The UE may indicate in a notification part of the IKEv2 authentication request that the UE supports MOBIKE. The ePDG IP address to which the UE needs to form IPSec tunnel is discovered via DNS query. After the UE is authenticated, UE is also authorized for access to the default APN. The procedure is as described in TS 33.402 (which is incorporated herein by reference). For networks supporting multiple mobility protocols, if there was any dynamic IPMS decision involved in this step, the decision is stored in the 3GPP AAA Server. The PDN GW information is returned as part of the reply from the 3GPP AAA Server to the ePDG. The PDN GW selection takes place at this point. This may entail an additional name resolution step, issuing a request to a DNS Server. If the Attach Type does not indicate "Handover", the ePDG may perform a new PDN GW selection procedure, e.g. to allocate a PDN GW that allows for more efficient routing. During the IKEv2 tunnel set up procedure, the UE indicates the Attach type as "additional attach" and/or flow information (e.g., by using some IKE payloads) if the UE wants to set up additional connectivity to the existing PDN GW and exchange flows with such PDN GW over different access networks simultaneously. In this case, the ePDG does not perform PDN GW selection but uses the existing one stored in HSS/AAA.

In step 2, the ePDG sends the Proxy Binding Update (MN-NAI, Lifetime, APN, Access Technology Type, Handover Indicator, Additional attach indication, GRE key for downlink traffic, flow information) message to the PDN GW. Access Technology Type option is set to a value matching the characteristics of the non-3GPP access. Handover Indicator is set to indicate attachment over a new interface. The proxy binding update message shall be secured. The MN NAI identifies the UE. The Lifetime field must be set to a nonzero value in the case of a registration and a zero value in the case of a de-registration. The APN is used by the PDN GW to determine which PDN to establish connectivity for, in the case that the PDN GW supports multiple PDN connectivity. If the Attach Type is "additional attach", the Additional attach indication is present.

In step 3, the PDN GW initiates the IP CAN Session Establishment or medication Procedure with the PCRF, as specified in TS 23.203 [19]. Note that the PDN GW does not need to inform the 3GPP AAA Server of the PDN GW identity if the Attach Type is "initial attach". Otherwise, the 3GPP AAA Server then informs the HSS of the PDN GW identity and APN associated with the UE's PDN Connection. This information is registered in the HSS.

In step 4, the PDN GW processes the proxy binding update and creates a binding cache entry for the UE. The PDN GW allocates an IP address for the UE. The PDN GW then sends a Proxy Binding Ack (MN NAI, UE Address Info, GRE Key for uplink traffic) message to the ePDG, including the IP address(es) allocated for the UE (identified by the MN NAI). Note, if UE requests for both IPv4 and IPv6 addresses, both are allocated. If the UE requests for only IPv4 or IPv6 address only one address is allocated accordingly.

In step 5, the IPSec tunnel setup is completed. In step 6, After the Proxy Binding Update is successful, the ePDG is authenticated by the UE. In step 7, The ePDG sends the final IKEv2 message with the IP address in IKEv2 Configuration payloads. If the Attach type indicates "additional attach", the same IP address allocated to the UE to access the PDN GW is also returned here. In step 8, IP connectivity from the UE to the PDN GW is now setup. Any packet in the uplink direction is tunneled to the ePDG by the UE using the IPSec tunnel. The ePDG then tunnels the packet to the PDN GW. From the PDN GW normal IP-based routing takes place. In the downlink direction, the packet for UE (HoA) arrives at the PDN GW. The PDN GW tunnels the packet based on the binding cache entry to the ePDG. The ePDG then tunnels the packet to the UE via proper IPSec tunnel.

The PCO Based Indication

Discussed in this section is another approach—i.e., to extend the UE requested PDN connectivity procedure—which provides an indication different from "initial attach" and "handover" in the PCO. In the following describes procedures that can be performed by a UE over different types of access networks to set up additional connectivity to the existing PDN GW in order to exchange different flows over different access networks simultaneously. Note that the information regarding what flows should be forwarded over which access is carried in signaling messages exchanged between the UE and the network. For example, to describe certain flows, some Protocol Configuration Options (PCO) carried in the GTP/PMIP messages and some mobility options carried in the PMIP messages and certain fields/payloads in other types of messages can be defined to describe flows, such as a tuple of source IP address, destination IP address, protocol type, source port number, destination port number and so on. Such flow descriptions can be included in the signaling messages as shown and described as flow information in various following procedures.

1) Over the GTP Based 3GPP Access Network

Figure 13:
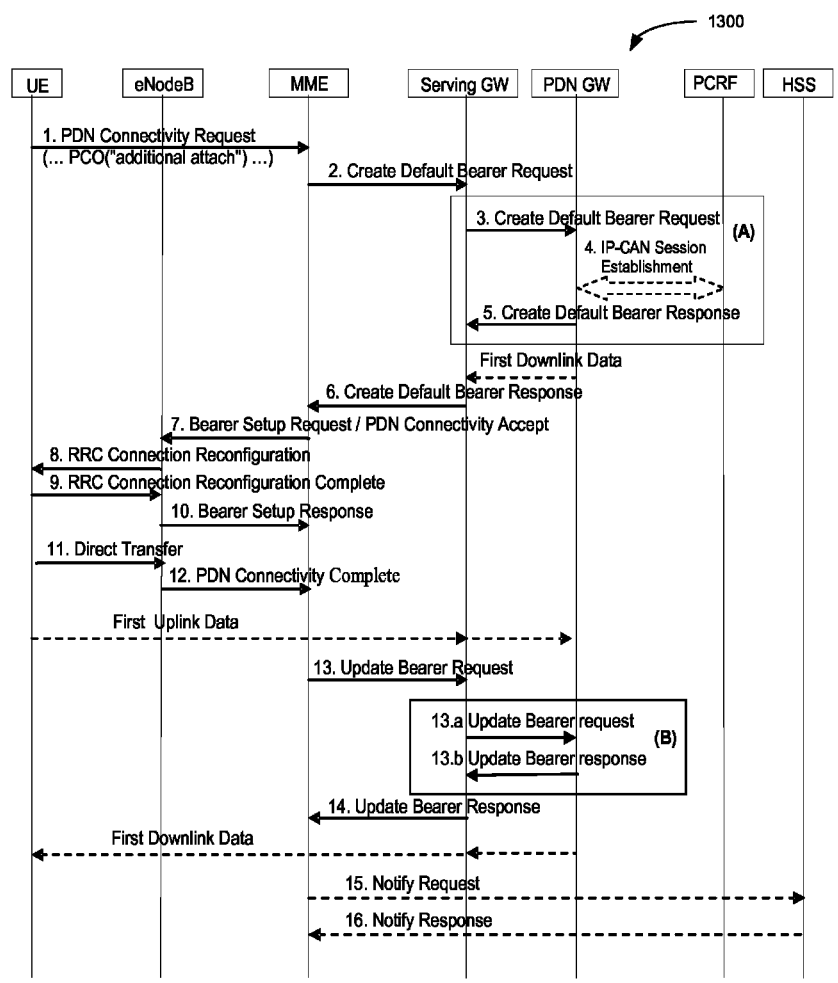
FIG. 13 illustrates a UE requested PDN connectivity procedure including a PCO based "additional attach" indication on the GTP based 3GPP access.

FIG. 13 illustrates a UE requested PDN connectivity procedure 1300 including a PCO based "additional attach" indication on the GTP based 3GPP access. For a PMIP-based S5/S8, procedure steps (A) are defined in TS 23.402. Steps 3, 4, and 5 concern GTP based S5/S8. The UE also uses this procedure to request re-establishment of existing PDN connectivity upon handover from non-3GPP accesses. The steps in (B) are executed only upon handover from non-3GPP access.

In step 1, the UE initiates the UE Requested PDN procedure by the transmission of a PDN Connectivity Request (APN or Default APN indicator, PDN Type, Protocol Configuration Options, Request Type, flow information) message. If the UE was in ECM-IDLE mode, this NAS message is preceded by the Service Request procedure. PDN type indicates the requested IP version (IPv4, IPv4/v6, IPv6). The MME verifies that the APN provided by UE is allowed by subscription. If the UE provides an indicator requesting to use the Default APN instead of APN, the Default APN shall be used for the remainder of this procedure. Protocol Configuration Options (PCOs) are used to transfer parameters between the UE and the PDN GW, and are sent transparently through the MME and the Serving GW. The Protocol Configuration Options may include the Address Allocation Preference, which indicates that the UE prefers to obtain an IPv4 address only after the default bearer activation by means of DHCPv4.

The Request Type indicates "initial request" if the UE requests new additional PDN connectivity over the 3GPP access network. In case of multiple PDN connections, the Request Type indicates "handover" when the UE is performing a handover from non-3GPP access and the UE has already established connectivity with the PDN over the non-3GPP access. When the UE wants to set up additional connectivity to the already connected PDN GW so as to exchange different flows over different access networks, including the GTP based 3GPP access network, the UE includes a specific PCO indicating that this is not initial attach or handover, but "additional attach" and the Request Type in this case is set as "handover". An indicator for requesting use of the Default APN is to be defined during stage 3 works. e.g. a pre-defined string such as 'default' or lack of APN. This indicator should be known to all UEs. It's FFS whether the other values of the PDN Address Allocation and related use should be considered.

In step 2, if the Request Type indicates "Handover", the MME uses the PDN GW stored in the Subscription Data retrieved by the MME during the authentication performed at attach. If the Request Type indicates "initial attach" the MME selects a PDN GW as described in clause 4.3.8.1 on PDN GW Selection Function (3GPP accesses), allocates a Bearer Id, and sends a Create Default Bearer Request WSI, MSISDN, MME TEID for control plane, RAT type, PDN GW address, PDN Address, Default Bearer QoS, PDN Type, APN-AMBR, APN, EPS Bearer Id, Protocol Configuration Options, Handover Indication, ME Identity, User Location Information (ECGI), Selection Mode, Charging Characteristics, Trace Reference, Trace Type, Trigger Id, OMC Identity, Maximum APN Restriction, Dual Address Bearer Flag, flow information) message to the Serving GW. The PCO indicating the "additional attach" is also included if such PCO is sent by the UE at the step 1.

The RAT type is provided in this message for the later PCC decision. The MSISDN is included if the MME has it stored for that UE. Handover Indication is included if the Request Type indicates "handover". Selection Mode indicates whether a subscribed APN was selected, or whether a non-subscribed APN sent by the UE or a non-subscribed APN chosen by the SGSN was selected. Selection Mode is set according to Annex A of TS 23.060. The P-GW may use Selection Mode when deciding whether to accept or reject the default bearer activation. For example, if an APN requires subscription, the P-GW is configured to accept only the default bearer activation that requests a subscribed APN as indicated by Selection Mode. Charging Characteristics indicates which kind of charging the bearer context is liable for.

The charging characteristics for the PS subscription and individually subscribed APNs as well as the way of handling Charging Characteristics and whether to send them or not to the P-GW is defined in TS 32.251. The MME shall include Trace Reference, Trace Type, Trigger Id, and OMC Identity if S-GW and/or P-GW trace is activated. The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type (see clause 15.4 of TS 23.060). If the P-GW receives the Maximum APN Restriction, then the P-GW shall check if the Maximum APN Restriction value does not conflict with the APN Restriction value associated with this bearer context request. If there is no conflict the request shall be allowed, otherwise the request shall be rejected with sending an appropriate error cause to the UE.

If the PDN subscription context contains a subscribed IPv4 address and/or IPv6 prefix, the MME indicates it in the PDN address. The Dual Address Bearer Flag shall be set when the PDN type is set to IPv4v6 and all SGSNs which the UE may be handed over to are Release 8 or above supporting dual addressing, which is determined based on node pre-configuration by the operator. If the UE request PDN type IPv4v6 but the subscription data only allow IPv4 or IPv6 IP address for this APN the MME will set the PDN type to IPv4 or IPv6 as indicated in subscription data. Note, the Dual Address Bearer Flag is not used when the Protocol Type over S5/S8 is PMIP.

In step 3, the Serving GW creates a new entry in its EPS Bearer table and sends a Create Default Bearer Request (IMSI, MSISDN, Serving GW Address for the user plane, Serving GW TEID of the user plane, Serving GW TEID of the control plane, RAT type, Default Bearer QoS, PDN Type, PDN Address, APN-AMBR, APN, Bearer Id, Protocol Configuration Options, Handover Indication, ME Identity, User Location Information (ECGI), Selection Mode, Charging Characteristics, Trace Reference, Trace Type, Trigger Id, OMC Identity, Maximum APN Restriction, Dual Address Bearer Flag, flow information) message to the PDN GW indicated in the PDN GW address received in the previous step. After this step, the Serving GW buffers any downlink packets the Serving GW may receive from the PDN GW until the Serving GW receives the message in step 11 below. The MSISDN is included if received from the MME. If the Handover Indication (HI) is included, the Serving GW includes the HI in the Create Default Bearer Request message. The PCO indicating the "additional attach" is also included if such PCO is sent by the UE at the step 1.

In step 4, if the Handover Indication is not present, the PDN GW may employ an IP-CAN Session Establishment procedure as defined in TS 23.203 with the PCRF to get the default PCC rules for the UE if PCRF is applied in the network. This may lead to the establishment of a number of dedicated bearers following the procedures defined in clause 5.4.1 in association with the establishment of the default bearer which is described in Annex F. The RAT type is provided to the PCRF by the PDN GW if received by the previous message. If the PDN GW/PCEF is configured to activate predefined PCC rules for the default bearer, the interaction with the PCRF is not required (e.g., operator may configure to do this) at the moment.

If the Handover Indication or the PCO indicating "additional attach" is present, the PDN GW executes a PCEF-Initiated IP-CAN Session Modification procedure with the PCRF as specified in TS 23.203 to obtain the rules required for the PDN GW in the VPLMN or HPLMN to function as the PCEF for all the active sessions the UE has established with the new IP-CAN type as a result of the handover procedure. If the updated PCC rules require establishment of dedicated bearer for the UE, the establishment of those bearers takes place in combination with the default bearer as described in Annex F.

In step 5, the P-GW creates a new entry in its EPS bearer context table and generates a Charging Id. The new entry allows the P-GW to route user plane PDUs between the S-GW and the packet data network, and to start charging. The way the P-GW handles Charging Characteristics that the P-GW (or PDN GW) may have received is defined in TS 32.251.

The PDN GW returns a Create Default Bearer Response (PDN GW Address for the user plane, PDN GW TEID of the user plane, PDN GW TEID of the control plane, PDN Type, PDN Address, EPS Bearer Id, Protocol Configuration Options, Charging Id, Prohibit Payload Compression, APN Restriction, Cause, CGI/SAI/RAI change report required, APN-AMBR) message to the Serving GW. The PDN GW takes into account the PDN type sent by the UE, the Dual Address Bearer Flag and the policies of operator when the PDN GW selects the PDN type to be used as follows. If the UE has requested PDN type IPv4v6 and both IPv4 and IPv6 addressing are possible in the PDN but the Dual Address Bearer Flag is not set, or only single IP version addressing for this APN is possible in the PDN, the PDN GW selects a single IP version (either IPv4 or IPv6). If the UE has requested PDN type IPv4 or IPv6, the PDN GW uses the PDN type supplied by the UE in case it is supported in the PDN, otherwise an appropriate error cause will be returned.

The PDN GW allocates a PDN Address according to the selected PDN Type. In case the PDN GW has selected a PDN type different from the one sent by the UE, the PDN GW indicates together with the PDN type IE a reason cause (network preference, single address bearers only) to the UE why the PDN type has been modified. PDN Address may contain an IPv4 address for IPv4 and/or an IPv6 prefix and an Interface Identifier. If the PDN has been configured by the operator so that the PDN addresses for the requested APN shall be allocated by usage of DHCPv4 only, or if the PDN GW allows the UE to use DHCPv4 for address allocation according to the Address Allocation Preference received from the UE, the PDN Address shall be set to 0.0.0.0, indicating that the IPv4 address shall be negotiated by the UE with after completion of the Default Bearer Activation procedure. In case of external PDN addressing for IPv6, the PDN GW obtains the IPv6 prefix from the external PDN using either RADIUS or Diameter client function. In the PDN Address field of the Create Default Bearer Response, the PDN GW includes the Interface Identifier and IPv6 prefix.

The PDN GW sends Router Advertisement to the UE after default bearer establishment with the IPv6 prefix information for all cases. If the PDN address is contained in the Create Default Bearer Request, the PDN GW shall allocate the IPv4 address and/or IP6 prefix contained in the PDN address to the UE. If Handover Indication indicates "Handover" or the PCO indicates "additional attach", the PDN Address Information shall contain the same IP address the UE obtained during PDN connectivity establishment over the non-3GPP access. Protocol Configuration Options contains the BCM as well as optional PDN parameters that the P-GW may transfer to the UE. These optional PDN parameters may be requested by the UE, or may be sent unsolicited by the P-GW. Protocol Configuration Options are sent transparently through the MME. When the Handover Indication is present, the PDN GW does not yet send downlink packets to the SGW; the downlink path is to be switched at step 11*a*.

In step 6, if the CGI/SAI/RAI change report required is received for this bearer context, then the S-GW shall store this for the bearer context and the S-GW shall report to that P-GW whenever a CGI/SAI/RAI change occurs that meets the P-GW request, as described in clause 15.1.1a of TS 23.060. The Serving GW returns a Create Default Bearer Response (PDN Type, PDN Address, Serving GW address for User Plane, Serving GW TEID for User Plane, Serving GW TEID for control plane, EPS Bearer Id, Protocol Configuration Options, Charging Id, Prohibit Payload Compression, APN Restriction, Cause, CGI/SAI/RAI change report required, APN-AMBR) message to the MME. The DL TFT for PMIP-based S5/S8 is obtained from interaction between the Serving GW and the PCRF as described in clause 5.6.1 of TS 23.402, when PCC is deployed; otherwise, the DL TFT IE is wild-carded, matching any downlink traffic. If the UE indicates the Request Type as "Handover" or one PCO as "additional attach", this message also serves as an indication to the MME that the S5 bearer setup and update has been successful. At this step the GTP tunnel(s) over S5 are established.

In step 7, if an APN Restriction is received, then the MME shall store this value for the Bearer Context and the MME shall check this received value with the stored value for the Maximum APN Restriction to ensure there are no conflicts between values. If the consequence of this check results in the PDN connectivity being rejected, the MME shall initiate a Bearer Deactivation and return an appropriate error cause. If the PDN Connectivity Request is accepted, the MME shall determine a (new) value for the Maximum APN Restriction. If there is no previously stored value for Maximum APN Restriction, then the Maximum APN Restriction shall be set to the value of the received APN Restriction.

If the CGI/SAI/RAI change report required is received for this bearer context, then the MME shall store this for the bearer context and the MME shall report whenever a CGI/SAI/RAI change occurs that meets the request, as described in clause 15.1.1a of TS 23.060. The MME may need to modify the UE AMBR, which has been assigned to the eNB, based on the subscribed UE-AMBR and the updated set of APN-AMBRs in use. The principles to determine the UE-AMBR are described in clause 4.7.3.

The MME sends PDN Connectivity Accept (APN, PDN Type, PDN Address, EPS Bearer Id, Session Management Configuration, Session Management Request, Protocol Configuration Options) message to the eNodeB. This message is contained in an S1_MME control message Bearer Setup Request (EPS Bearer QoS, UE-AMBR, PDN Connectivity Accept, S1-TEID). This S1 control message includes the TEID at the Serving GW used for user plane and the address of the Serving GW for user plane. In the PDN Connectivity Accept message, the MME does not include the IPv6 prefix within the PDN Address. The MME includes the APN-AMBR and the EPS Bearer QoS parameter QCI into the Session Management Request. Furthermore, if the UE has UTRAN or GERAN capabilities, the MME uses the EPS bearer QoS information to derive the corresponding PDP context parameters QoS Negotiated (R99 QoS profile), Radio Priority, Packet Flow Id and TI and includes them in the Request. If the UE indicated in the UE Network Capability that it does not support BSS packet flow procedures, then the MME shall not include the Packet Flow Id. MME will not send the S1 Bearer Setup Request message until any outstanding S1 Bearer Setup Response message for the same UE has been received or timed out. If the APN-AMBR has changed the MME may update the UE-AMBR if appropriate. The MME may provide the eNodeB with Handover Restriction List. Handover Restriction List is described in clause 4.3.5.7 "Mobility Restrictions". If the MME has changed the PDN Type based on the user subscription it will add a reason cause of "subscription limitation" and return to the UE.

In step 8, the eNodeB sends RRC Connection Reconfiguration to the UE including the PDN Connectivity Accept message. The UE shall store the QoS Negotiated, Radio Priority, Packet Flow Id and TI, which the UE received in the Session Management Configuration IE, for use when accessing via GERAN or UTRAN. The UE may provide EPS Bearer QoS parameters to the application handling the traffic flow. The application usage of the EPS Bearer QoS is implementation dependent. The UE shall not reject the RRC Connection Reconfiguration on the basis of the EPS Bearer QoS parameters contained in the Session Management Request.

If the UE receives an IPv4 address set to 0.0.0.0, the UE may negotiate the IPv4 address with DHCPv4 as specified in TS 29.061. If the UE receives an IPv6 interface identifier, the UE may wait for the Router Advertisement from the network with the IPv6 prefix information or it may send a Router Solicitation if necessary. Note, the IP address allocation details are described in clause 5.3.1 on "IP Address Allocation".

In step 9, the UE sends the RRC Connection Reconfiguration Complete to the eNodeB. In step 10, the eNodeB send an S1-AP Bearer Setup Response to the MME. The S1-AP message includes the TEID of the eNodeB and the address of the eNodeB used for downlink traffic on the S1_U reference point. In step 11, the UE NAS layer builds a PDN Connectivity Complete message including EPS Bearer Identity. The UE then sends a Direct Transfer (PDN Connectivity Complete) message to the eNodeB.

In step 12, the eNodeB sends an Uplink NAS Transport (PDN Connectivity Complete) message to the MME. After the PDN Connectivity Accept message and once the UE has obtained a PDN Address Information, the UE can then send uplink packets towards the eNodeB which will then be tunneled to the Serving GW and PDN GW. If the UE requested for a dual address PDN type (IPv4v6) to a given APN and was granted a single address PDN type (IPv4 or IPv6) by the network with a reason cause "single address bearers only", the UE may request for the activation of a parallel PDN connection to the same APN with a single address PDN type (IPv4 or IPv6) other than the one already activated. If the UE receives no reason cause in step 8 in response to an IPv4v6 PDN type and the UE receives an IPv6 prefix and Interface Identifier apart from the IPv4 address or 0.0.0.0 in the PDN Address field, the UE considers that the request for a dual address PDN was successful. It can wait for the Router Advertisement from the network with the IPv6 prefix information or the UE may send a Router Solicitation if necessary.

In step 13, upon reception of the Bearer Setup Response message in step 10 and the PDN Connectivity Complete message in step 12, the MME sends an Update Bearer Request (eNodeB address, eNodeB TEID, Handover Indication) message to the Serving GW. If Request Type indicates "handover", the Handover Indication is also included. In step 13a, if the Handover Indication is included in step 11, the Serving GW sends an Update Bearer Request (Handover Indication) message to the PDN GW to prompt the PDN GW to tunnel packets from non 3GPP IP access to 3GPP access system and immediately start routing packets to the Serving GW for the default and any dedicated EPS bearers established. In step 13b, the PDN GW acknowledges by sending Update Bearer Response to the Serving GW.

In step 14, the Serving GW acknowledges by sending Update Bearer Response (EPS Bearer Identity) to the MME. The Serving GW can then send its buffered downlink packets. EPS Bearer Identity is included if the Request Type indicates "handover".

In step 15, after the MME receives Update Bearer Response in step 13, if Request type does not indicate handover and an EPS bearer was established and if the subscription data indicates that the user is allowed to perform handover to non-3GPP accesses and if this is the first PDN connection associated with this APN and if the MME selected a PDN GW that is different from the PDN GW identity which was previously indicated by the HSS in the PDN subscription context, the MME shall send an Update Location Request including the PDN GW address and the APN to the HSS for mobility with non-3GPP accesses.

In step 16, the HSS stores the PDN GW identity and the associated APN, and sends an Update Location Response to the MME. Note, for handover from non-3GPP access, the PDN GW initiates resource allocation deactivation procedure in the trusted/untrusted non-3GPP IP access as specified in TS 23.402.

2) Over the PMIP Based 3GPP Access Network

Figure 14:
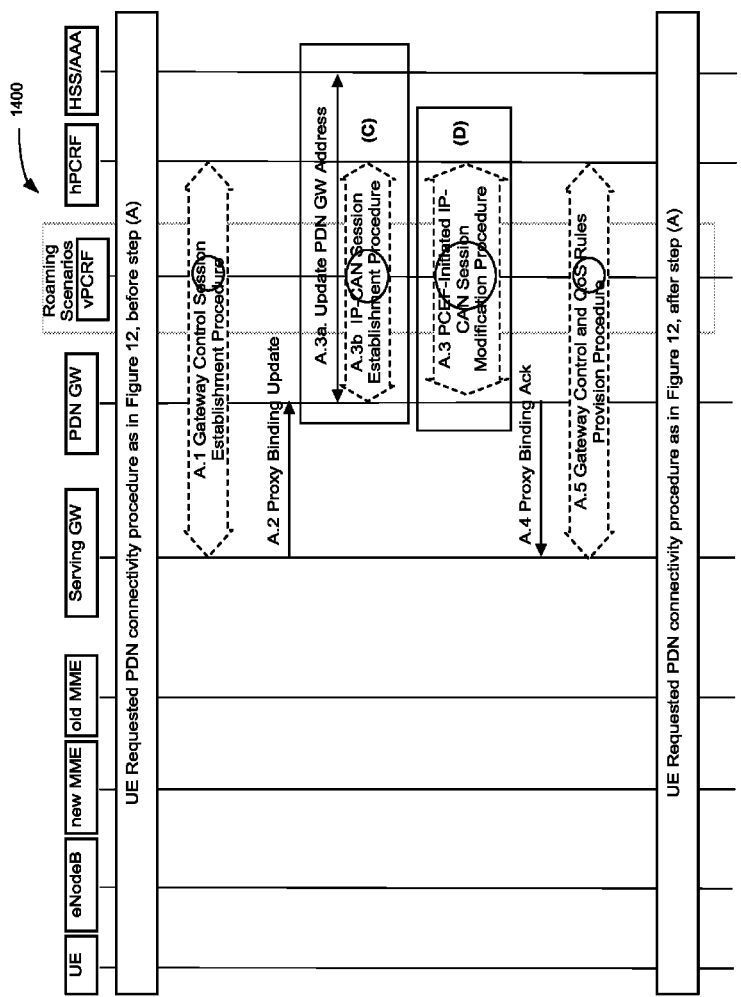
FIG. 14 illustrates a UE requested PDN connectivity procedure including a PCO based "additional attach" indication on the PMIP based 3GPP access.

FIG. 14 illustrates a UE requested PDN connectivity procedure 1400 including a PCO based "additional attach" indication on the PMIP based 3GPP access. The procedure 1400 is similar to the procedure associated with that implemented for the GTP based 3GPP access network. Note that in A.2 Proxy Binding Update and A.4 Proxy Binding Ack, the PCO indicating "additional attach" and/or flow information are present if the UE includes one PCO set as "additional attach" before.

3) Over the Trusted Non 3GPP Access Network with PMIP

Figure 15:
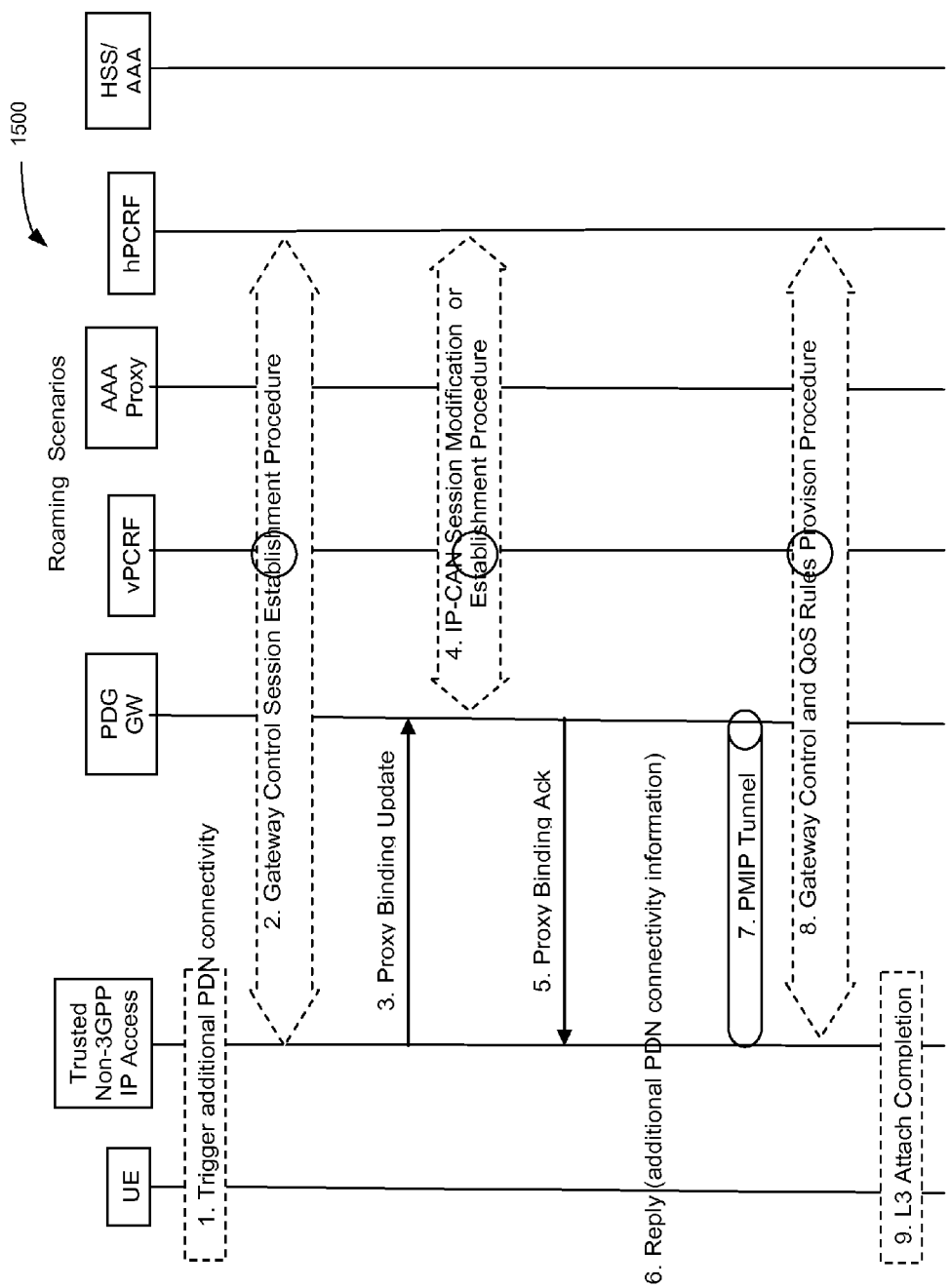
FIG. 15 illustrates a UE requested PDN connectivity procedure including an "additional attach" indication on the PMIP based trusted non3GPP access.

FIG. 15 illustrates a UE requested PDN connectivity procedure 1500 including an "additional attach" indication on the PMIP based trusted non3GPP access.

In step 1, when the UE wishes to connect to an additional PDN over an access network, the UE sends a trigger indicating that connectivity with that specific PDN is desired. The UE provides information about the new PDN by using an APN. The UE triggers the re-establishment of existing PDN connectivity after the handover by providing a Request Type indicating "Handover" on accesses that support the indication. The UE provides an indication of "Additional attach" and the Request type as "handover" and/or the flow information on the access that supports these indications if the UE wants to set up additional connectivity to an already connected PDN GW and exchange different flows over different access networks simultaneously. The indication of "Additional attach" can be carried, for example, in an extended DHCP message or the extended router solicitation message. Note, the definition of the trigger that the UE provides to the access network (MAG) is out of scope of 3GPP.

In step 2, the Trusted non-3GPP access initiates the Gateway Control Session Establishment Procedure with the PCRF, as specified in TS 23.203. The Trusted non-3GPP access provides the information to the PCRF to correctly associate the PCRF with the IP-CAN session to be established or modified in step 4 and also to convey subscription related parameters to the PCRF. Note that if the indication of "additional attach" is received, the trusted non-3gpp access network does not select a new PDN GW but uses an existing PDN GW corresponding to the provided APN.

In step 3, the MAG function of Trusted Non-3GPP IP Access sends a Proxy Binding Update (MN-NAI, Lifetime, Access Technology Type, Handover Indicator, Additional Attach Indicator, APN, GRE key for downlink traffic, Additional Parameters, flow information) message to PDN GW. The MN NAI identifies the UE. The Lifetime field must be set to a nonzero value in the case of a registration and a zero value in the case of a de-registration. Access Technology Type is set to a value matching the characteristics of the non-3GPP access. Handover Indicator is set to "initial" attach if the UE has provided Attach Type indicating "Initial" attach or if the Attach Type indicates "Handover" and the PDN subscription profile contains no PDN GW. The Additional Parameters may include Protocol Configuration Options and other information. If the indication of "additional attach" is received, an additional attach indication is also carried in the Proxy Binding Update message, for example, in a PCO or a mobility option or a field.

In step 4, the PDN GW initiates the IP-CAN Session Modification or Establishment Procedure with the PCRF, as specified in TS 23.203. The PDN GW provides information to the PCRF used to identify the session and associate Gateway Control Sessions established in step 2 correctly. The PCRF creates IP-CAN session related information and responds to the PDN GW with PCC rules and event triggers. If the indication of "additional attach" is received, the PDN GW is not changed. Therefore, the PDN GW does not need to informs the 3GPP AAA Server of its PDN GW identity and the APN corresponding to the UE's PDN Connection or register in the HSS, since such information is already stored in the network.

In step 5, the PDN GW processes the proxy binding update and creates a binding cache entry for the UE. The PDN GW allocates IP address(es) for the UE. The PDN GW then sends a Proxy Binding Acknowledgement (MN NAI, Lifetime, UE Address Info, GRE key for uplink traffic, Additional Parameters) message to the MAG function in Trusted Non-3GPP IP Access, including the IP address(es) allocated for the UE. The UE Address Info includes one or more IP addresses. The Lifetime indicates the duration of the binding. The Additional Parameters may include Protocol Configuration Options and other information. If UE requests for both IPv4 and IPv6 addresses, both are allocated. If the UE requests for only IPv4 or IPv6 address only one address is allocated accordingly.

In step 6, the trusted non-3GPP access system sends the reply message to the UE with the allocated IP address from the PDN that the UE indicated at step 1. Since UE requested for additional PDN connectivity, the UE configures the IP address received from the MAG without deleting its configuration for connectivity with any other previously established PDN. For handover or the indication of "additional attach" is received, the UE is returned the same IP address the UE obtained during PDN connectivity establishment over the 3GPP access. Note, the definition of the message used to carry the new connectivity information to the UE is out of scope of 3GPP.

In step 7, the PMIPv6 tunnel is thus set up between the Trusted Non-3GPP IP Access and the PDN GW corresponding to the requested additional PDN while maintaining tunnels previously established for other PDNs. In step 8, the PCRF may update the QoS rules in the trusted non-3GPP access by initiating the GW Control Session Modification Procedure, as specified in TS 23.203. In step 9, the L3 attach procedure is completed via non-3GPP access specific trigger. IP connectivity between the UE and the PDN GW is set for uplink and downlink directions. At this step the IP address information is provided to the UE.

4) Over the Untrusted Non 3GPP Access Network with PMIP

Figure 16:
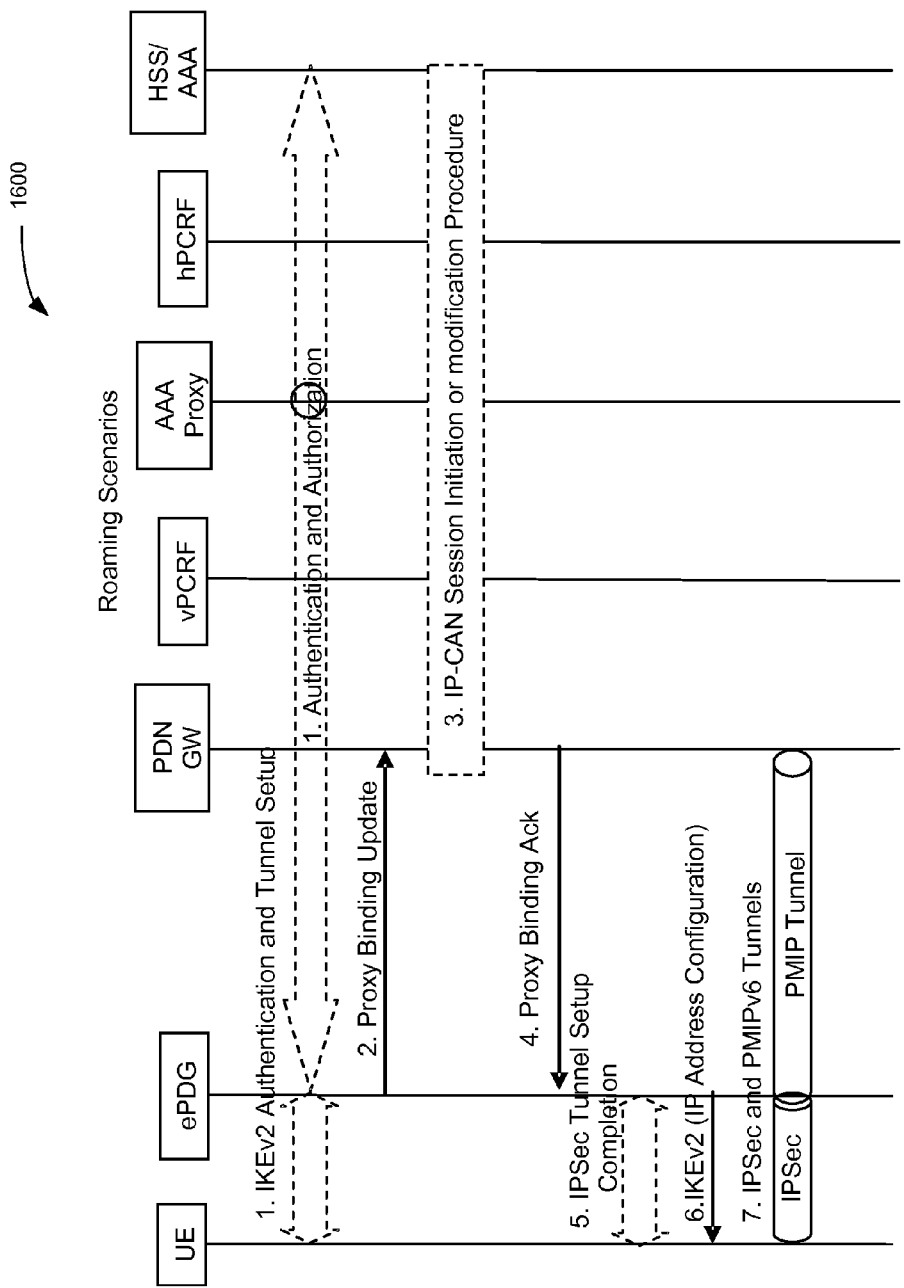
FIG. 16 illustrates a UE requested PDN connectivity procedure including an "additional attach" indication on the PMIP based untrusted non3GPP access.

FIG. 16 illustrates a UE requested PDN connectivity procedure 1600 including an "additional attach" indication on the PMIP based untrusted non3GPP access.

In step 1, the IKEv2 tunnel establishment procedure is started by the UE. The UE may indicate in a notification part of the IKEv2 authentication request that it supports MOBIKE. The ePDG IP address to which the UE needs to form IPSec tunnel is discovered via DNS query. After the UE is authenticated, UE is also authorized for access to the default APN. The procedure is as described in TS 33.402. For networks supporting multiple mobility protocols, if there was any dynamic IPMS decision involved in this step, the decision is stored in the 3GPP AAA Server. The PDN GW information is returned as part of the reply from the 3GPP AAA Server to the ePDG. The PDN GW selection takes place at this point. This may entail an additional name resolution step, issuing a request to a DNS Server.

If the Attach Type does not indicate "Handover", the ePDG may perform a new PDN GW selection procedure, e.g. to allocate a PDN GW that allows for more efficient routing. During the IKEv2 tunnel set up procedure, the UE provides an indication of "additional attach" and/or flow information (for example, by using the IKE payloads/messages) if the UE wants to set up additional connectivity to the existing PDN GW and exchange flows with such PDN GW over different access networks simultaneously. In addition, the UE may request the same IP address allocated before in the IKE message. In this case, the ePDG does not perform PDN GW selection but uses the existing one stored in HSS/AAA.

In step 2, the ePDG sends the Proxy Binding Update (MN-NAI, Lifetime, APN, Access Technology Type, Handover Indicator, Additional attach indication, GRE key for downlink traffic, flow information) message to the PDN GW. Access Technology Type option is set to a value matching the characteristics of the non-3GPP access. Handover Indicator is set to indicate attachment over a new interface. The proxy binding update message shall be secured. The MN NAI identifies the UE. The Lifetime field must be set to a nonzero value in the case of a registration and a zero value in the case of a de-registration. The APN is used by the PDN GW to determine which PDN to establish connectivity for, in the case that the PDN GW supports multiple PDN connectivity. If the indication of "additional attach" is received during the step 1), the Additional attach indication is present, for example, carried in either a PCO or a mobility option or a field.

In step 3, the PDN GW initiates the IP CAN Session Establishment or medication Procedure with the PCRF, as specified in TS 23.203 [19]. Note that the PDN GW does not need to inform the 3GPP AAA Server of the PDN GW identity if the indication of "initial attach" is received. Otherwise, the 3GPP AAA Server then informs the HSS of the PDN GW identity and APN associated with the UE's PDN Connection. This information is registered in the HSS.

In step 4, the PDN GW processes the proxy binding update and creates a binding cache entry for the UE. The PDN GW allocates an IP address for the UE. The PDN GW then sends a Proxy Binding Ack (MN NAI, UE Address Info, GRE Key for uplink traffic) message to the ePDG, including the IP address(es) allocated for the UE (identified by the MN NAI). Note, if UE requests for both IPv4 and IPv6 addresses, both are allocated. If the UE requests for only IPv4 or IPv6 address only one address is allocated accordingly.

In step 6, after the Proxy Binding Update is successful, the ePDG is authenticated by the UE.

In step 7, the ePDG sends the final IKEv2 message with the IP address in IKEv2 Configuration payloads. If the indication of "additional attach" is received, the same IP address allocated to the UE to access the PDN GW is also returned here.

In step 8, IP connectivity from the UE to the PDN GW is now setup. Any packet in the uplink direction is tunneled to the ePDG by the UE using the IPSec tunnel. The ePDG then tunnels the packet to the PDN GW. From the PDN GW normal IP-based routing takes place. In the downlink direction, the packet for UE (HoA) arrives at the PDN GW. The PDN GW tunnels the packet based on the binding cache entry to the ePDG. The ePDG then tunnels the packet to the UE via proper IPSec tunnel.

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 17:
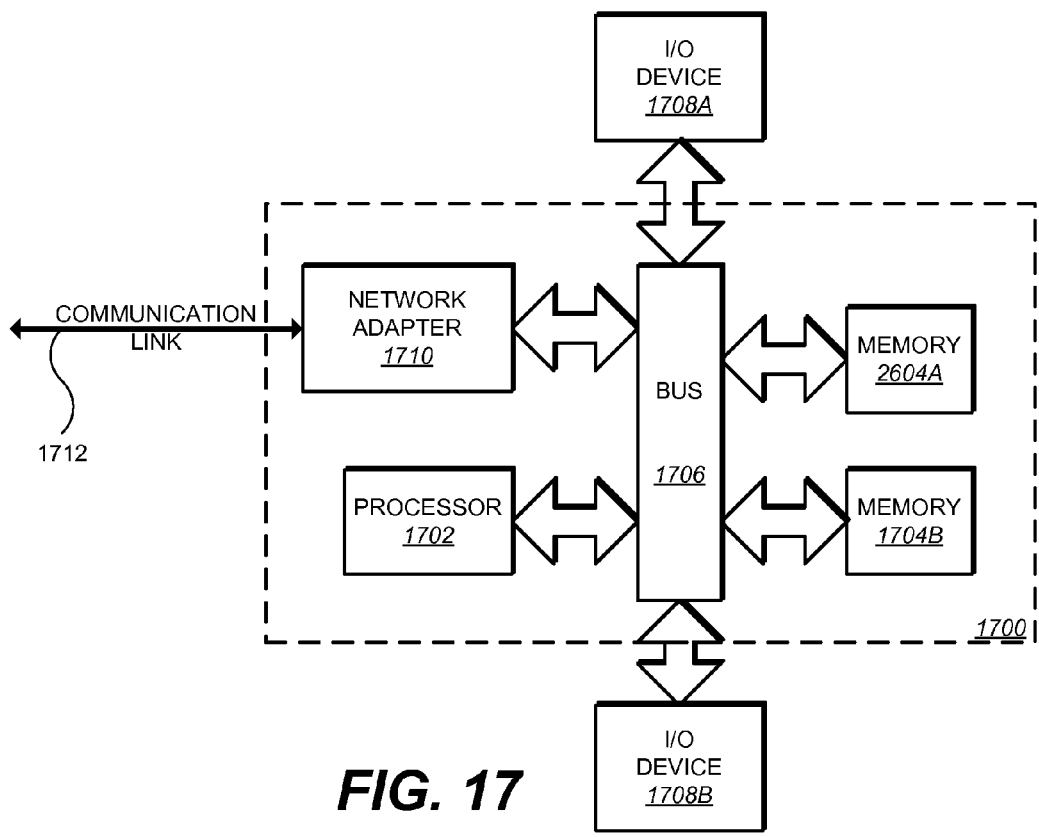
FIG. 17 is a block diagram of a data processing system suitable for storing and/or executing program code.

FIG. 17 illustrates a data processing system 1700 (e.g., a UE, enodeB, or mobile node) suitable for storing and/or executing program code. Data processing system 1700 includes a processor 1702 coupled to memory elements 1704A-B through a system bus 1706. In other implementations, data processing system 1700 includes more than one processor and each processor can be coupled directly or indirectly to one or more memory elements through a system bus. Memory elements 1704A-B can include local memory employed during actual execution of the program code, bulk storage, and cache memories that provide temporary storage of at least some program code in order to reduce the number of times the code must be retrieved from bulk storage during execution. As shown, input/output or I/O devices 1708A-B (including, but not limited to, keyboards, displays, pointing devices, etc.) are coupled to data processing system 1700. I/O devices 1708A-B may be coupled to data processing system 1700 directly or indirectly through intervening I/O controllers (not shown).

In one implementation, a network adapter 1710 is coupled to data processing system 1700 to enable data processing system 1700 to become coupled to other data processing systems or remote printers or storage devices through communication link 1712. Communication link 1712 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for establishing, between a mobile node and a packet data network, (i) first connection via a first access network and (ii) a second connection via a second access network, the method comprising:
    transmitting, by the mobile node, a request for establishing the second connection, via the second access network, between the mobile node and the packet data network, wherein the second access network is different from the first access network, wherein the request includes a parameter that indicates a type of the request, and wherein the parameter is configured to be set to one of
        (i) an initial attach type, if the mobile node is to establish the second connection with the packet data network when no other connections exists between the mobile node and the packet data network,
        (ii) a handover type, or
        (iii) an additional attach type, if the mobile node is to establish the second connection with the packet data network when a connection, which is different from the second connection, already exists between the mobile node and the packet data network;
    determining that prior to transmitting the request, the first connection via the first access network has already been established between the mobile node and the packet data network;
    (i) in response to determining that prior to transmitting the request, the first connection via the first access network has already been established between the mobile node and the packet data network and (ii) prior to transmitting the request, setting the parameter in the request to the additional attach type; and
    in response to transmitting, by the mobile node, the request for establishing the second connection, establishing the second connection, via the second access network, between the mobile node and the packet data network, wherein data is sent simultaneously from the mobile node to the packet data network using (i) the first connection via the first access network, and (ii) the second connection via the second access network, and wherein the second connection is different from the first connection.

2. The method of claim 1, wherein:
    the first access network is a 3rd Generation Partnership Project (3GPP) access network; and
    the second access network is a non-3rd Generation Partnership Project (3GPP) access network.

3. The method of claim 1, further comprising:
    establishing a third connection, via the second access network, between the mobile node and the packet data network, wherein data is sent simultaneously from the mobile node to the packet data network using (i) the first connection established via the first access network, (ii) the second connection established via the second access network, and (iii) the third connection established via the second access network, and wherein the third connection is different from each of (i) the first connection and (ii) the second connection.

4. The method of claim 1, further comprising:
    subsequent to establishing the second connection, detecting a loss of connectivity, via the first access network, between the mobile node and the packet data network; and
    in response to detecting the loss of connectivity, via the first access network, between the mobile node and the packet data network, migrating the first connection such that the first connection is established, via the second access network, between the mobile node and the packet data network, wherein data is sent simultaneously from the mobile node to the packet data network using (i) the first connection established via the second access network, and (ii) the second connection established via the second access network.

5. The method of claim 1, wherein the packet data network is a first packet data network, and wherein the method further comprises:
    establishing a third connection, via the second access network, between the mobile node and a second packet data network, wherein the third connection is different from each of (i) the first connection and (ii) the second connection; and
    simultaneously sending data (i) from the mobile node to the first packet data network via the first connection and the second connection, and (ii) from the mobile node to the second packet data network via the third connection.

6. The method of claim 1, wherein the request is a first request, and wherein establishing the first connection, via the first access network, between the mobile node and the packet data network comprises:
    transmitting, by the mobile node, a second request for establishing the first connection, wherein the second request includes another parameter that indicates a type of the second request; and
    (i) in response to no connections being established between the mobile node and the packet data network while the second request is to be transmitted and (ii) prior to transmitting the second request, setting the another parameter in the second request to the initial attach type.

7. The method of claim 1, wherein the parameter in the request is set to the additional attach type to indicate that the mobile node is already connected to the packet data network via another connection, wherein the another connection comprises the first connection.

8. The method of claim 1, further comprising:
in response to establishing the first connection, storing, by the mobile node, a first internet protocol address associated with the packet data network.

9. The method of claim 1, wherein:
the second access network is a 3rd Generation Partnership Project (3GPP) access network; and
the first access network is a non-3rd Generation Partnership Project (3GPP) access network.

10. An apparatus comprising:
a processor;
a memory coupled to the processor; and
a network adapter for establishing (i) a first connection via a first access network and (ii) a second connection via a second access network, the network adapter configured to
transmit a request for establishing the second connection, via the second access network, with the packet data network, wherein the second access network is different from the first access network, wherein the request includes a parameter that indicates a type of the request, and wherein the parameter is configured to be set to one of
(i) an initial attach type, if the apparatus is to establish the second connection with the packet data network when no other connections exists between the apparatus and the packet data network,
(ii) a handover type, or
(iii) an additional attach type, if the apparatus is to establish the second connection with the packet data network when a connection, which is different from the second connection, already exists between the apparatus and the packet data network,
determine that prior to transmitting the request, the first connection via the first access network has already been established between the apparatus and the packet data network,
(i) in response to determining that prior to transmitting the request, the first connection via the first access network has already been established between the apparatus and the packet data network and (ii) prior to transmitting the request, set the parameter in the request to the additional attach type, and
in response to transmitting the request for establishing the second connection, establish the second connection, via the second access network, with the packet data network, wherein data is sent simultaneously from the apparatus to the packet data network using (i) the first connection via the first access network, and (ii) the second connection via the second access network, and wherein the second connection is different from the first connection.

11. The apparatus of claim 10, wherein:
the first access network is a 3rd Generation Partnership Project (3GPP) access network; and
the second access network is a non-3rd Generation Partnership Project (3GPP) access network.

12. The apparatus of claim 10, wherein the network adapter is further configured to:

establish a third connection, via the second access network, with the packet data network, wherein data is sent simultaneously from the apparatus to the packet data network using (i) the first connection established via the first access network, (ii) the second connection established via the second access network, and (iii) the third connection established via the second access network, and wherein the third connection is different from each of (i) the first connection and (ii) the second connection.

13. The apparatus of claim 10, wherein the network adapter is further configured to:
subsequent to establishing the second connection, detect a loss of connectivity, via the first access network, with the packet data network; and
in response to detecting the loss of connectivity, via the first access network, with the packet data network, migrate the first connection such that the first connection is established, via the second access network, with the packet data network, wherein data is sent simultaneously from the apparatus to the packet data network using (i) the first connection established via the second access network, and (ii) the second connection established via the second access network.

14. The apparatus of claim 10, wherein the packet data network is a first packet data network, and wherein the network adapter is further configured to:
establish a third connection, via the second access network, with a second packet data network, wherein the third connection is different from each of (i) the first connection and (ii) the second connection; and
simultaneously send data (i) from the apparatus to the first packet data network via the first connection and the second connection, and (ii) from the apparatus to the second packet data network via the third connection.

15. The apparatus of claim 10, wherein the request is a first request, and wherein the network adapter is configured to establish the first connection, via the first access network, with the packet data network by:
transmitting a second request for establishing the first connection, wherein the second request includes another parameter that indicates a type of the second request; and
(i) in response to no connections being established between the apparatus and the packet data network while the second request is to be transmitted and (ii) prior to transmitting the second request, setting the another parameter in the second request to the initial attach type.

16. The apparatus of claim 10, wherein parameter in the request is set to the additional attach type to indicate that the apparatus is already connected to the packet data network via another connection, wherein the another connection comprises the first connection.

17. The apparatus of claim 10, wherein:
in response to establishing the first connection, the apparatus is configured to store a first internet protocol address associated with the packet data network.

18. The apparatus of claim 10, wherein:
the second access network is a 3rd Generation Partnership Project (3GPP) access network; and
the first access network is a non-3rd Generation Partnership Project (3GPP) access network.

19. A method for establishing multiple connections between a mobile node and a packet data network, the method comprising:
establishing a first connection, via a first access network, between the mobile node and the packet data network;

transmitting, by the mobile node, a request for establishing a second connection, via a second access network, between the mobile node and the packet data network, wherein the second access network is different from the first access network, wherein the request includes a parameter that indicates a type of the request, and wherein the parameter is configured to be set to one of (i) an initial attach type, (ii) a handover type, or (iii) an additional attach type;

(i) in response to the first connection being already established between the mobile node and the packet data network while the request is to be transmitted and (ii) prior to transmitting the request, setting the parameter in the request to the additional attach type; and in response to transmitting, by the mobile node, the request for establishing the second connection, establishing the second connection, via the second access network, between the mobile node and the packet data network, wherein data is sent simultaneously from the mobile node to the packet data network using (i) the first connection via the first access network, and (ii) the second connection via the second access network, and wherein the second connection is different from the first connection.

* * * * *